United States Patent
White et al.

(10) Patent No.: US 12,465,493 B2
(45) Date of Patent: Nov. 11, 2025

(54) ORTHOPAEDIC SYSTEM WITH INSERT HAVING A POST FOR MEDIAL PIVOTING OF A FEMORAL COMPONENT

(71) Applicant: DEPUY IRELAND UNLIMITED COMPANY, Ringaskiddy (IE)

(72) Inventors: Stephen E. White, Fort Wayne, IN (US); William J. Maloney, Palo Alto, CA (US)

(73) Assignee: DePuy Ireland Unlimited Company, Ringaskiddy (IE)

(*) Notice: Subject to any disclaimer, the term of this patent is extended or adjusted under 35 U.S.C. 154(b) by 1057 days.

(21) Appl. No.: 17/438,208

(22) PCT Filed: Mar. 11, 2020

(86) PCT No.: PCT/US2020/022123
§ 371 (c)(1),
(2) Date: Sep. 10, 2021

(87) PCT Pub. No.: WO2020/185912
PCT Pub. Date: Sep. 17, 2020

(65) Prior Publication Data
US 2022/0175542 A1    Jun. 9, 2022

Related U.S. Application Data

(60) Provisional application No. 62/817,164, filed on Mar. 12, 2019.

(51) Int. Cl.
*A61F 2/38* (2006.01)
*A61F 2/30* (2006.01)

(52) U.S. Cl.
CPC .......... *A61F 2/3868* (2013.01); *A61F 2/3859* (2013.01); *A61F 2/3886* (2013.01); *A61F 2/389* (2013.01)

(58) Field of Classification Search
None
See application file for complete search history.

(56) References Cited

U.S. PATENT DOCUMENTS

| 3,748,662 A | 7/1973 | Helfet |
| 4,216,549 A | 8/1980 | Hillberry et al. |

(Continued)

FOREIGN PATENT DOCUMENTS

| CN | 103118635 A | 5/2013 |
| CN | 103327937 A | 9/2013 |

(Continued)

OTHER PUBLICATIONS

Advance, Medial-Pivot and Stemmed Medial-Pivot Knee Systems, Wright Medical Technology, Inc., 2010, 12 pages.

(Continued)

*Primary Examiner* — Ann Hu
(74) *Attorney, Agent, or Firm* — Barnes & Thornburg LLP

(57) ABSTRACT

An orthopaedic system includes a tibial insert and a femoral component configured to articulate on the tibial insert. The tibial insert includes a pair of articular surfaces spaced apart by a post. The femoral component includes a pair of femoral condyles spaced apart by a notch in which a cam is located. During flexion, the cam of the femoral component is configured to contact the post of the tibial insert. The dwell point of the medial articular surface of the tibial insert is located, relative to the contact point between the post and tibial insert, to improve stability of the femoral component.

7 Claims, 18 Drawing Sheets

(56) References Cited

U.S. PATENT DOCUMENTS

| | | |
|---|---|---|
| 4,944,757 A | 7/1990 | Martinez et al. |
| 5,219,362 A | 6/1993 | Tuke et al. |
| 5,271,737 A | 12/1993 | Baldwin et al. |
| 5,344,460 A | 9/1994 | Turanyi et al. |
| 5,356,414 A | 10/1994 | Cohen et al. |
| 5,370,701 A | 12/1994 | Finn |
| 5,405,349 A | 4/1995 | Burkinshaw et al. |
| 5,486,178 A | 1/1996 | Hodge |
| 5,658,341 A | 8/1997 | Delfosse |
| 5,662,656 A | 9/1997 | White |
| 5,667,512 A | 9/1997 | Johnson |
| 5,682,886 A | 11/1997 | Delp et al. |
| 5,709,689 A | 1/1998 | Ferrante et al. |
| 5,735,856 A | 4/1998 | Mccue et al. |
| 5,769,854 A | 6/1998 | Bastian et al. |
| 5,782,925 A | 7/1998 | Collazo et al. |
| 5,810,829 A | 9/1998 | Elliott et al. |
| 5,871,018 A | 2/1999 | Delp et al. |
| 5,964,808 A | 10/1999 | Blaha et al. |
| 5,976,147 A | 11/1999 | Lasalle et al. |
| 6,013,103 A | 1/2000 | Kaufman et al. |
| 6,033,410 A | 3/2000 | Mclean et al. |
| 6,258,095 B1 | 7/2001 | Lombardo et al. |
| 6,506,215 B1 | 1/2003 | Letot et al. |
| 6,986,791 B1 | 1/2006 | Metzger |
| 7,081,137 B1 | 7/2006 | Servidio |
| 7,115,133 B2 | 10/2006 | Plumet et al. |
| 7,261,740 B2 | 8/2007 | Tuttle et al. |
| 7,625,407 B2 | 12/2009 | Akizuki et al. |
| 7,674,268 B2 | 3/2010 | Cuckler et al. |
| 7,695,519 B2 | 4/2010 | Collazo |
| 7,731,755 B2 * | 6/2010 | Wyss ................ A61F 2/3868 623/20.27 |
| 7,740,662 B2 | 6/2010 | Barnett et al. |
| 8,187,335 B2 | 5/2012 | Wyss et al. |
| 8,192,498 B2 | 6/2012 | Wagner et al. |
| 8,211,181 B2 | 7/2012 | Walker |
| 8,236,061 B2 | 8/2012 | Heldreth et al. |
| 8,292,964 B2 | 10/2012 | Walker |
| 8,328,873 B2 | 12/2012 | Metzger et al. |
| 8,382,846 B2 | 2/2013 | Samuelson et al. |
| 8,480,752 B2 | 7/2013 | Dun |
| 8,480,762 B2 | 7/2013 | Yoshimitsu |
| 8,586,486 B2 | 11/2013 | Chen et al. |
| 8,617,250 B2 | 12/2013 | Metzger |
| 8,628,579 B2 | 1/2014 | Ries et al. |
| 8,771,280 B2 | 7/2014 | Bailey et al. |
| 8,784,496 B2 | 7/2014 | Wagner et al. |
| 8,795,380 B2 | 8/2014 | Heldreth et al. |
| 8,808,388 B2 | 8/2014 | McKinnon et al. |
| 8,828,086 B2 | 9/2014 | Williams et al. |
| 8,834,575 B2 | 9/2014 | Wyss et al. |
| 8,915,965 B2 | 12/2014 | Komistek |
| 9,050,107 B2 | 6/2015 | Sordelet et al. |
| 9,101,393 B2 | 8/2015 | Jordan et al. |
| 9,101,394 B2 | 8/2015 | Arata et al. |
| 9,168,145 B2 | 10/2015 | Wyss et al. |
| 9,216,088 B2 | 12/2015 | Wasielewski |
| 9,220,600 B2 | 12/2015 | Mihalko et al. |
| 9,220,601 B2 | 12/2015 | Williams et al. |
| 9,282,981 B2 | 3/2016 | Chaney et al. |
| 9,283,082 B2 | 3/2016 | Sanford et al. |
| 9,295,557 B2 | 3/2016 | Wentorf et al. |
| 9,299,138 B2 | 3/2016 | Zellner et al. |
| 9,320,616 B2 | 4/2016 | Samuelson et al. |
| 9,320,624 B2 | 4/2016 | Shin |
| 9,326,864 B2 | 5/2016 | Wyss et al. |
| 9,402,726 B2 | 8/2016 | Linderman et al. |
| 9,452,053 B2 | 9/2016 | Wagner et al. |
| 9,539,099 B2 | 1/2017 | Heldreth et al. |
| 9,603,711 B2 | 3/2017 | Bojarski et al. |
| 9,668,870 B2 | 6/2017 | Wasielewski |
| 9,707,088 B2 | 7/2017 | Samuelson et al. |
| 9,730,745 B2 | 8/2017 | Biedermann et al. |
| 9,788,954 B2 | 10/2017 | Parisi et al. |
| 9,820,821 B2 | 11/2017 | Aram et al. |
| 9,861,446 B2 | 1/2018 | Lang |
| 9,861,490 B2 | 1/2018 | Wentorf et al. |
| 9,931,216 B2 | 4/2018 | Williams et al. |
| 9,937,049 B2 | 4/2018 | Wyss et al. |
| 9,962,264 B2 | 5/2018 | Komistek |
| 10,080,663 B2 | 9/2018 | Wasielewski |
| 10,159,530 B2 | 12/2018 | Lang |
| 10,179,051 B2 | 1/2019 | Heldreth et al. |
| 10,179,052 B2 | 1/2019 | Clary et al. |
| 10,195,056 B2 | 2/2019 | Wogoman et al. |
| 10,201,429 B2 | 2/2019 | Enomoto et al. |
| 10,265,180 B2 | 4/2019 | Wyss et al. |
| 10,278,827 B2 * | 5/2019 | Drury ................ A61F 2/389 |
| 10,478,307 B2 | 11/2019 | Wasielewski et al. |
| 10,543,098 B2 | 1/2020 | Williams et al. |
| 10,729,551 B2 | 8/2020 | Heldreth et al. |
| 10,849,760 B2 | 12/2020 | Wyss et al. |
| 11,141,291 B2 | 10/2021 | Wogoman et al. |
| 11,160,659 B2 * | 11/2021 | Drury ................ A61F 2/28 |
| 11,229,485 B2 | 1/2022 | Otto et al. |
| 11,324,598 B2 | 5/2022 | Dai et al. |
| 11,337,823 B2 | 5/2022 | Williams et al. |
| 11,364,081 B2 | 6/2022 | Dees, Jr. |
| 11,369,478 B2 | 6/2022 | Wyss et al. |
| 11,612,488 B2 | 3/2023 | Wogoman et al. |
| 11,865,011 B2 * | 1/2024 | Heldreth ................ A61F 2/389 |
| 2002/0161448 A1 | 10/2002 | Hayes, Jr. et al. |
| 2003/0009228 A1 | 1/2003 | Figueroa et al. |
| 2003/0055509 A1 | 3/2003 | Mccue et al. |
| 2005/0075638 A1 | 4/2005 | Collazo |
| 2005/0096747 A1 | 5/2005 | Tuttle et al. |
| 2005/0107886 A1 | 5/2005 | Crabtree et al. |
| 2005/0278035 A1 | 12/2005 | Wyss et al. |
| 2007/0185581 A1 | 8/2007 | Akizuki et al. |
| 2008/0161918 A1 | 7/2008 | Fankhauser et al. |
| 2008/0262812 A1 | 10/2008 | Arata et al. |
| 2008/0269596 A1 | 10/2008 | Revie et al. |
| 2009/0088860 A1 | 4/2009 | Romeis et al. |
| 2009/0125114 A1 | 5/2009 | May et al. |
| 2009/0204221 A1 | 8/2009 | Walker |
| 2009/0306786 A1 | 12/2009 | Samuelson |
| 2010/0010635 A1 | 1/2010 | Straszheim-Morley et al. |
| 2010/0036499 A1 | 2/2010 | Pinskerova |
| 2010/0161067 A1 | 6/2010 | Saleh et al. |
| 2010/0168753 A1 | 7/2010 | Edwards et al. |
| 2010/0286788 A1 * | 11/2010 | Komistek ............ A61F 2/3877 623/20.23 |
| 2010/0305711 A1 | 12/2010 | Mckinnon et al. |
| 2011/0153026 A1 | 6/2011 | Heggendorn et al. |
| 2012/0035737 A1 | 2/2012 | Sanford et al. |
| 2012/0197409 A1 | 8/2012 | Mckinnon et al. |
| 2012/0265496 A1 | 10/2012 | Mahfouz |
| 2012/0310246 A1 | 12/2012 | Belcher et al. |
| 2012/0310362 A1 | 12/2012 | Li et al. |
| 2013/0006373 A1 | 1/2013 | Wyss et al. |
| 2013/0006376 A1 | 1/2013 | Gorab et al. |
| 2013/0006378 A1 | 1/2013 | Wogoman |
| 2013/0197653 A1 | 8/2013 | Hawkins et al. |
| 2013/0197654 A1 | 8/2013 | Samuelson et al. |
| 2013/0325021 A1 | 12/2013 | Sordelet et al. |
| 2014/0039635 A1 | 2/2014 | Bartels et al. |
| 2014/0052268 A1 | 2/2014 | Sanford et al. |
| 2014/0081412 A1 | 3/2014 | Metzger |
| 2014/0148811 A1 | 5/2014 | Reeve et al. |
| 2014/0277534 A1 | 9/2014 | Wasielewski |
| 2014/0277537 A1 | 9/2014 | Todd et al. |
| 2014/0330388 A1 | 11/2014 | Mizuguchi et al. |
| 2015/0032215 A1 | 1/2015 | Slamin et al. |
| 2015/0088264 A1 | 3/2015 | Li et al. |
| 2015/0190235 A1 | 7/2015 | Mcminn |
| 2015/0282936 A1 * | 10/2015 | Parisi ................ A61F 2/389 623/20.32 |
| 2016/0030184 A1 | 2/2016 | Whiteside |
| 2016/0262771 A1 | 9/2016 | Edwards |
| 2016/0317312 A1 * | 11/2016 | Bojarski ................ A61F 2/384 |
| 2017/0020674 A1 | 1/2017 | Walker |
| 2017/0079801 A1 | 3/2017 | Drury et al. |
| 2017/0128219 A1 | 5/2017 | Metzger et al. |

(56) References Cited

U.S. PATENT DOCUMENTS

| | | |
|---|---|---|
| 2017/0189191 A1 | 7/2017 | Heldreth et al. |
| 2017/0189195 A1 | 7/2017 | Blaha |
| 2017/0266013 A1 | 9/2017 | Enomoto et al. |
| 2017/0340389 A1 | 11/2017 | Otto et al. |
| 2019/0209331 A1 | 7/2019 | Varadarajan et al. |
| 2019/0209333 A1 | 7/2019 | Drury et al. |
| 2019/0240032 A1 | 8/2019 | Wasielewski et al. |
| 2020/0069432 A1 | 3/2020 | Mcminn |
| 2020/0085583 A1 | 3/2020 | Hodge |
| 2020/0100902 A1 | 4/2020 | Wasielewski et al. |
| 2020/0214843 A1 | 7/2020 | Radermacher et al. |
| 2020/0246149 A1 | 8/2020 | Matyas et al. |
| 2020/0268520 A1 | 8/2020 | Pak et al. |
| 2022/0079678 A1 | 3/2022 | Duxbury et al. |

FOREIGN PATENT DOCUMENTS

| | | | | |
|---|---|---|---|---|
| CN | 102596107 A | 7/2017 | | |
| CN | 108135701 A | 6/2018 | | |
| DE | 202004006060 U1 | 8/2004 | | |
| EP | 1604623 A1 * | 12/2005 | ........... | A61F 2/3868 |
| EP | 2145606 A1 * | 1/2010 | ........... | A61F 2/3886 |
| EP | 2572677 A1 | 3/2013 | | |
| EP | 3854353 A1 | 7/2021 | | |
| EP | 4014929 A1 * | 6/2022 | ........... | A61F 2/3859 |
| JP | 2006015133 A | 1/2006 | | |
| JP | 20050171256 A | 1/2006 | | |
| JP | 2010012253 A | 1/2010 | | |
| JP | 2010012255 A | 1/2010 | | |
| JP | 2011542566 A | 6/2012 | | |
| JP | 2012513254 A | 6/2012 | | |
| JP | 2013551379 A | 5/2014 | | |
| JP | 2014510562 A | 5/2014 | | |
| JP | 2014527419 A | 10/2014 | | |
| JP | 2015016379 A | 1/2015 | | |
| WO | 9723172 A2 | 7/1997 | | |
| WO | 2005006993 A2 | 1/2005 | | |
| WO | 2010151564 A1 | 12/2010 | | |
| WO | 2011075697 A2 | 6/2011 | | |
| WO | 2013003433 A1 | 1/2013 | | |
| WO | 2014143538 A1 | 9/2014 | | |
| WO | 2017155995 A1 | 9/2017 | | |
| WO | 2017160889 A1 | 9/2017 | | |
| WO | 2017204832 A1 | 11/2017 | | |

OTHER PUBLICATIONS

Persona, The Personalized Knee, Surgical Technique, Zimmer Biomet, 2018, 76 pages.

Persona, The Personalized Knee, Medial Congruent Bearing Design Rationale, Zimmer Biomet, 2017, 20 pages.

EMP, Evolution, Medial-Pivot Knee System, The ACL-PCL Substituting Knee, Key Aspects, MicroPort Orthopaedics, 2015, 6 pages.

Evolution, Medial-Pivot Knee System, Surgical Technique, Distal Cut First, MicroPort Orthopaedics, 2014, 52 pages.

PCT Search Report & Written Opinion prepared for PCT/EP2021/069244, mailed Nov. 1, 2022, 24 pages.

Smith & Nephew, Journey II TKA Total Knee System—Combined Technique for Journey II BCS and Journey II CR, 68 pages.

International SR and Written Opinon for International App. No. PCT/US2020/022119, Completed May 27, 2020, 11 Pages.

International SR for International App. No. PCT/IB20/54105, Aug. 31, 2020, 3 Pages.

PCT International SR for International App. No. PCT/IB20/54110, Aug. 12, 2020, 3 Pages.

PCT International SR and Written Opinion for International App. No. PCT/EP2020/075246, Mar. 15, 2022, 11 Pages.

Notice of Reasons for Refusal, JP Application No. 2021-554721, Nov. 30, 2023 (6 pages).

Notice of Reasons for Refusal, JP Application No. 2021-554720, Dec. 5, 2023 (7 pages).

First Office Action CN Application No. 202080020406.X, Jan. 30, 2024 (9 pages).

Examination Report EP Application No. 20718018.3, Jan. 10, 2024 (6 pages).

Hossain, Fahad et al: "Knee Arthroplasty With a Medially Conforming Ball-and-Sock Tibiofemoral Articulation Provides Better Function", Annual Meeting of the Knee Society, vol. 469, No. 1, Jan. 1, 2011 (Jan. 1, 2011), pp. 55-63, XP055947606.

Shimmin Andrew et al: "Fluoroscopic Motion Study Confirming the Stability of a Medial Pivot Design Total Knee Arthroplasty", the Knee, Elsevier, Amsterdam, NL, vol. 22, No. 6, Dec. 7, 2014 (Dec. 7, 2014), pp. 522-526, XP029361524, ISSN: 0968-0160, DOI: 10.1016/J.KNEE.2014.11.011.

Morra, A., et al: "Virtual Geometric Constraint of Total Knee Arthroplasty Designs: Addressing Patient Needs", Orthopaedic Research Laboratories, Mar. 1, 2016 (Mar. 1, 2016), XP055947619.

Anonymous: "GMK Sphere Medially Stabillized Knee", Sep. 1, 2019 (Sep. 1, 2019), pp. 1-24, XP093115521.

Anonymous: "Medacta Announces 100,000 GMK Sphere Implanted Worldwide", Jun. 24, 2021 (Jun. 24, 2021), XP093115522, Retrieved From the Internet: URL:https://www.medacta.com/gr/news-detaipid-15123#atext=gmk%20sphere%2C.

Third Party Observation, European Patent Appln. No. 20718018.3, Jul. 8, 2022, 7 Pages.

International Search Report and Written Opinion for International Application No. PCT/US2020/022123, completed May 8, 2020, 13 pages.

* cited by examiner

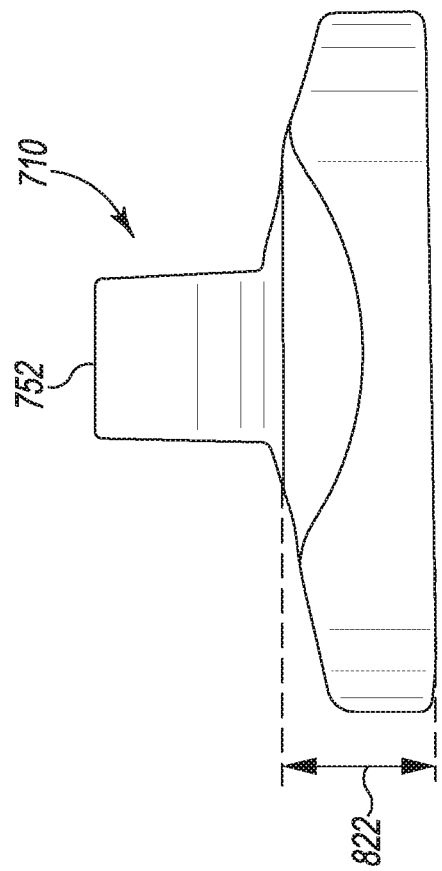
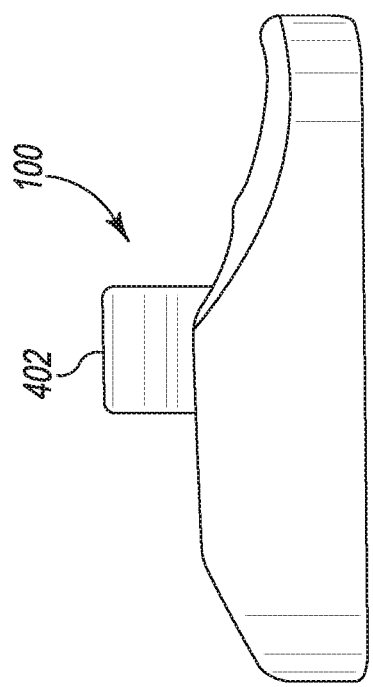

ORTHOPAEDIC SYSTEM WITH INSERT HAVING A POST FOR MEDIAL PIVOTING OF A FEMORAL COMPONENT

CROSS-REFERENCE TO RELATED APPLICATIONS

This patent application is the U.S. national phase application of PCT/US2020/022123, which was filed on Mar. 11, 2020, and which claims priority to and the benefit of U.S. Provisional Patent Application Ser. No. 62/817,164 entitled "ORTHOPAEDIC SYSTEM WITH INSERT HAVING A POST FOR MEDIAL PIVOTING OF A FEMORAL COMPONENT," which was filed on Mar. 12, 2019, the disclosures of both of which are hereby expressly incorporated by reference into this application.

TECHNICAL FIELD

The present disclosure relates to orthopaedic systems, and, more particularly, to orthopaedic systems for performing knee replacement surgery.

BACKGROUND

Joint arthroplasty is a well-known surgical procedure by which a diseased and/or damaged natural joint is replaced by a prosthetic joint. A typical knee prosthesis includes a tibial tray, a femoral component, and a polymer insert or bearing positioned between the tibial tray and the femoral component. Depending on the severity of the damage to the patient's joint, orthopaedic prostheses of varying mobility may be used. For example, the knee prosthesis may include a "fixed" tibial insert in cases wherein it is desirable to limit the movement of the knee prosthesis, such as when significant soft tissue damage or loss is present. Alternatively, the knee prosthesis may include a "mobile" tibial insert in cases wherein a greater degree of freedom of movement is desired. Additionally, the knee prosthesis may be a total knee prosthesis designed to replace the femoral-tibial interface of both condyles of the patient's femur or a uni-compartmental (or uni-condylar) knee prosthesis designed to replace the femoral-tibial interface of a single condyle of the patient's femur.

The type of orthopedic knee prosthesis used to replace a patient's natural knee may also depend on whether the patient's posterior cruciate ligament is retained or sacrificed (i.e., removed) during surgery. For example, if the patient's posterior cruciate ligament is damaged, diseased, and/or otherwise removed during surgery, a posterior-stabilized knee prosthesis may be used to provide additional support and/or control at later degrees of flexion. Alternatively, if the posterior cruciate ligament is intact, a cruciate-retaining knee prosthesis may be used.

Typical orthopaedic knee prostheses are generally designed to duplicate the natural movement of the patient's joint. As the knee is flexed and extended, the femoral and tibial components articulate and undergo combinations of relative anterior-posterior motion and relative internal-external rotation. However, the patient's surrounding soft tissue also impacts the kinematics and stability of the orthopaedic knee prosthesis throughout the joint's range of motion. That is, forces exerted on the orthopaedic components by the patient's soft tissue may cause unwanted or undesirable motion of the orthopaedic knee prosthesis. For example, the orthopaedic knee prosthesis may exhibit an amount of unnatural (paradoxical) anterior translation as the femoral component is moved through the range of flexion.

SUMMARY

The present disclosure provides an orthopaedic system with an insert that is configured to allow asymmetric pivoting of a femoral component bearing on the insert, a raised anterior medial surface that is conforming to the femoral component, and geometry to provide stability.

According to one aspect of the disclosure, a posterior-stabilized orthopaedic system includes a femoral component and a tibial insert. The femoral component includes a medial condyle, a lateral condyle spaced apart from the medial condyle by a notch, and cam located in the notch between the medial and lateral condyles. The tibial insert includes a medial articular surface, a lateral articular surface, and a post located between the medial and lateral articular surfaces. The medial and lateral articular surfaces may be asymmetrically-shaped relative to each other. The medial condyle of the femoral component may be configured to articulate on the medial articular surface of the tibial insert and the lateral condyle of the femoral component may be configured to articulate on the lateral articular surface of the tibial insert during flexion. The cam of the femoral component may initially contact a posterior surface of the post of the tibial insert at a contact location on the post during flexion. Additionally, when the tibial insert is viewed in a sagittal plane, the medial articular surface of the tibial insert may include a dwell point that is spaced by a distance in an anterior-posterior direction from the contact location of the post, the distance being less than or equal to 5 millimeters.

In some embodiments, the dwell point may be located on the medial articular surface of the tibial insert a distance from a posterior medial lip of the medial articular surface that is no more than 37% the overall anterior-posterior length of the medial articular surface. For example, the dwell point may be located on the medial articular surface of the tibia insert a distance from the posterior medial lip that is between 31% and 37% of the overall anterior-posterior length of the medial articular surface.

Additionally, in some embodiments, the cam of the femoral component may initially contact the posterior surface of the post of the tibial insert at the contact location at 80 degrees of flexion. In some embodiments, the tibial insert may include an anterior medial lip having a first height and an anterior lateral lip having a second height. In such embodiments, the first height of the anterior medial lip may be greater than the second height of the anterior lateral lip.

In some embodiments, the post may have a medial side and a lateral side that is asymmetric with the medial side when viewed in a transverse plane. Additionally or alternatively, the post may have an asymmetric profile when viewed in a transverse plane. In some embodiments, the post may have rounded corners when viewed in a transverse plane. Additionally, the notch of the femoral component may be partially defined by a plurality of inner curved walls.

In some embodiments, the medial articular surface of the tibial insert and a femoral articular surface of the medial condyle of the femoral component are more conforming than the lateral articular surface of the tibial insert and a femoral articular surface of the lateral condyle of the femoral component. For example, the medial articular surface of the tibial insert and the femoral articular surface of the medial condyle of the femoral component may have an anterior-posterior conformity of at least 96%. Additionally or alternatively, the medial articular surface of the tibial insert and the femoral articular surface of the medial condyle may have a medial-lateral conformity of at least 93%. Additionally or alternatively, the lateral articular surface of the tibial insert and the femoral articular surface of the lateral condyle may have a medial-lateral conformity of at least 93%.

According to another aspect, an orthopaedic system may include a femoral component, a posterior-stabilized tibial insert, and a revision constrained condylar tibial insert. The femoral component may include a medial condyle, a lateral condyle spaced apart from the medial condyle by a notch, and cam located in the notch between the medial and lateral condyles. The posterior-stabilized tibial insert may have a first medial articular surface, a first lateral articular surface, and a first post located between the first medial and first lateral articular surfaces. The first medial and first lateral articular surfaces may be asymmetrically-shaped relative to each other.

Similarly, the revision constrained condylar tibial insert may have a second medial articular surface, a second lateral articular surface, and a second post located between the second medial and second lateral articular surfaces. The second medial and second lateral articular surfaces may be asymmetrically-shaped relative to each other. Additionally, the second post may be larger than the first post of the posterior-stabilized tibial insert. Furthermore, the medial condyle of the femoral component may be configured to separately articulate on each of the first and second medial articular surfaces, and the lateral condyle of the femoral component may be configured to separately articulate on each the first and second lateral articular surfaces.

In some embodiments, when the femoral component articulates on the posterior-stabilized tibial insert, the cam of the femoral component initially contacts the first post at a contact location on the first post during flexion. In such embodiments, when the tibial insert is viewed in a sagittal plane, the first medial articular surface of the posterior stabilized tibial insert includes a first dwell point that is spaced by a distance in an anterior-posterior direction from the contact location of the first post, the distance being less than or equal to 5 millimeters.

Additionally, in some embodiments, the first dwell point may be located on the first medial articular surface of the posterior stabilized tibial insert a distance from a posterior medial lip of the first medial articular surface that is no more than 37% the overall anterior-posterior length of the first medial articular surface. For example, the first dwell point may be located on the first medial articular surface of the posterior stabilized tibial insert a distance from the posterior medial lip of the first medial articular surface that is between 31% and 37% of the overall anterior-posterior length of the first medial articular surface. Additionally, in some embodiments, the cam of the femoral component initially contacts the first post of the posterior stabilized tibial insert at the contact location at 80 degrees of flexion.

In some embodiments, when the femoral component articulates on the revision constrained condylar tibial insert, the cam of the femoral component initially contacts the second post at a contact location on the second post during flexion. In such embodiments, when viewed in a sagittal plane, the second medial articular surface of the revision constrained condylar tibial insert includes a second dwell point that is spaced by a distance in an anterior-posterior direction from the contact location of the second post, the distance being less than or equal to 5 millimeters. In such embodiments, the second dwell point is located on the second medial articular surface of the revision constrained condylar tibial insert a distance from a posterior medial lip of the second medial articular surface that is no more than 37% the overall anterior-posterior length of the second medial articular surface. For example, the second dwell point may be located on the second medial articular surface of the revision constrained condylar tibial insert a distance from the posterior medial lip of the second medial articular surface that is between 31% and 37% of the overall anterior-posterior length of the second medial articular surface. In some embodiments, the cam of the femoral component initially contacts the second post of the revision constrained condylar tibial insert at the contact location at 80 degrees of flexion.

In some embodiments, when the femoral component articulates on the revision constrained condylar tibial insert, the cam of the femoral component initially contacts the second post at a contact location on the second post during flexion. Additionally, when viewed in a sagittal plane, the second medial articular surface of the revision constrained condylar tibial insert includes a second dwell point that is spaced by a distance in an anterior-posterior direction from the contact location of the second post, the distance being less than or equal to 5 millimeters.

In some embodiments, the posterior-stabilized tibial insert may include an anterior medial lip having a first height and an anterior lateral lip having a second height. In such embodiments, the first height of the anterior medial lip may be greater than the second height of the anterior lateral lip. Additionally, the revision constrained condylar tibial insert may include an anterior medial lip having a third height and an anterior lateral lip having a fourth height. In such embodiments, the third height of the anterior medial lip may be greater than the fourth height of the anterior lateral lip.

Additionally, in some embodiments, the first post may have a medial side and a lateral side that is asymmetric with the medial side of the first post when viewed in a transverse plane. Additionally or alternatively, the second post may have a medial side and a lateral side that is asymmetric with the medial side of the second post when viewed in the transverse plane. In some embodiments, each of the first and second posts has an asymmetric profile when viewed in a transverse plane. Additionally, in some embodiments, each of the first and second posts has rounded corners when viewed in a transverse plane.

In some embodiments, the first medial articular surface of the posterior-stabilized tibial insert and a femoral articular surface of the medial condyle of the femoral component are more conforming than the first lateral articular surface of the posterior-stabilized tibial insert and a femoral articular surface of the lateral condyle of the femoral component. Additionally, in such embodiments, the second medial articular surface of the revision constrained condylar tibial insert and the femoral articular surface of the medial condyle of the femoral component may be more conforming than the second lateral articular surface of the revision constrained condylar tibial insert and the femoral articular surface of the lateral condyle of the femoral component. For example, in some embodiments, the first medial articular surface of the posterior-stabilized tibial insert and the femoral articular surface of the medial condyle of the femoral component may have an anterior-posterior conformity of at least 96%. Additionally, the second medial articular surface of the revision constrained condylar tibial insert and the femoral articular surface of the medial condyle of the femoral component may have an anterior-posterior conformity of at least 96%. Furthermore, in some embodiments, the first medial articular surface of the posterior-stabilized tibial insert and the femoral articular surface of the medial condyle may have a medial-lateral conformity of at least 93%. Additionally, the lateral medial articular surface of the revision constrained condylar tibial insert and the femoral articular surface of the medial condyle may have a medial-lateral conformity of at least 93%.

According to yet another aspect, an orthopaedic system may include a tibial insert, a first femoral component, and a second femoral component. The tibial insert includes a medial articular surface, a lateral articular surface, and a post located between the medial and lateral articular surfaces. The medial and lateral articular surfaces are asymmetrically-shaped relative to each other.

The first femoral component may include a first medial condyle, a first lateral condyle spaced apart from the first medial condyle by a first notch, and a first cam located in the first notch between the first medial and first lateral condyles. The first medial condyle may be configured to articulate on the medial articular surface of the tibial insert, and the first lateral condyle may be configured to articulate on the lateral articular surface of the tibial insert during flexion. The first cam may initially contact the post of the tibial insert at a first contact location on the first post during flexion.

The second femoral component may include a second medial condyle, a second lateral condyle spaced apart from the second medial condyle by a second notch, and a second cam located in the second notch between the second medial and second lateral condyles. The second medial condyle may be configured to articulate on the medial articular surface of the tibial insert, and the second lateral condyle may be configured to articulate on the lateral articular surface of the tibial insert during flexion. The second cam may initially contact the post of the tibial insert at a second contact location on the second post during flexion. Additionally, the second medial and lateral condyles may have a thickness greater than a thickness of the first medial and lateral condyles.

The medial articular surface of the tibial insert may include a dwell point that is spaced by a first distance in an anterior-posterior direction from the first contact location and by a second distance in the anterior-posterior direction from the second contact location. The first and second distances may be less than or equal to 5 millimeters.

In some embodiments, each of the first notch of the first femoral component and the second notch of the second femoral component is partially defined by a plurality of respective inner curved walls. Additionally, in some embodiments, the medial articular surface of the tibial insert and a femoral articular surface of the first medial condyle of the first femoral component may be more conforming than the lateral articular surface of the tibial insert and a femoral articular surface of the first lateral condyle of the first femoral component. In such embodiments, the medial articular surface of the tibial insert and a femoral articular surface of the second medial condyle of the second femoral component may be more conforming than the lateral articular surface of the tibial insert and a femoral articular surface of the second lateral condyle of the second femoral component. For example, the medial articular surface of the tibial insert and the femoral articular surface of the first medial condyle of the first femoral component may have an anterior-posterior conformity of at least 96%, and the medial articular surface of the tibial insert and the femoral articular surface of the second medial condyle of the second femoral component may have an anterior-posterior conformity of at least 96%. Additionally or alternatively, the medial articular surface of the tibial insert and the femoral articular surface of the first medial condyle may have a medial-lateral conformity of at least 93%, and the medial articular surface of the tibial insert and the femoral articular surface of the second medial condyle may have a medial-lateral conformity of at least 93%.

BRIEF DESCRIPTION OF THE DRAWINGS

The detailed description particularly refers to the following figures, in which:

FIG. 8I is a front elevation view of the tibial insert of the orthopaedic system of FIG. 7A;

FIG. 8J is a front elevation view of the tibial insert of FIGS. 1 and 3B;

DETAILED DESCRIPTION OF THE DRAWINGS

Figure 1:
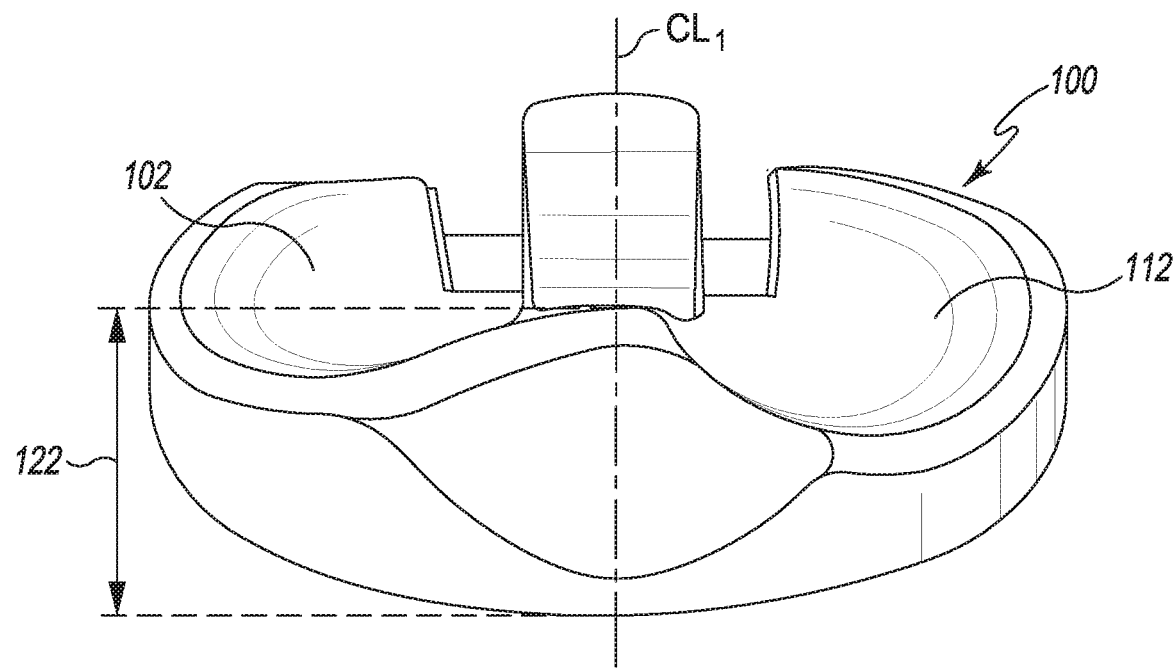
FIG. 1 is a front perspective view of a tibial insert having a post located between asymmetric articular surfaces.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

Terms representing anatomical references, such as anterior, posterior, medial, lateral, superior, inferior, etcetera, may be used throughout the specification in reference to the orthopaedic implants and orthopaedic surgical instruments described herein as well as in reference to the patient's natural anatomy. Such terms have well-understood meanings in both the study of anatomy and the field of orthopaedics. Use of such anatomical reference terms in the written description and claims is intended to be consistent with their well-understood meanings unless noted otherwise.

Figure 2:
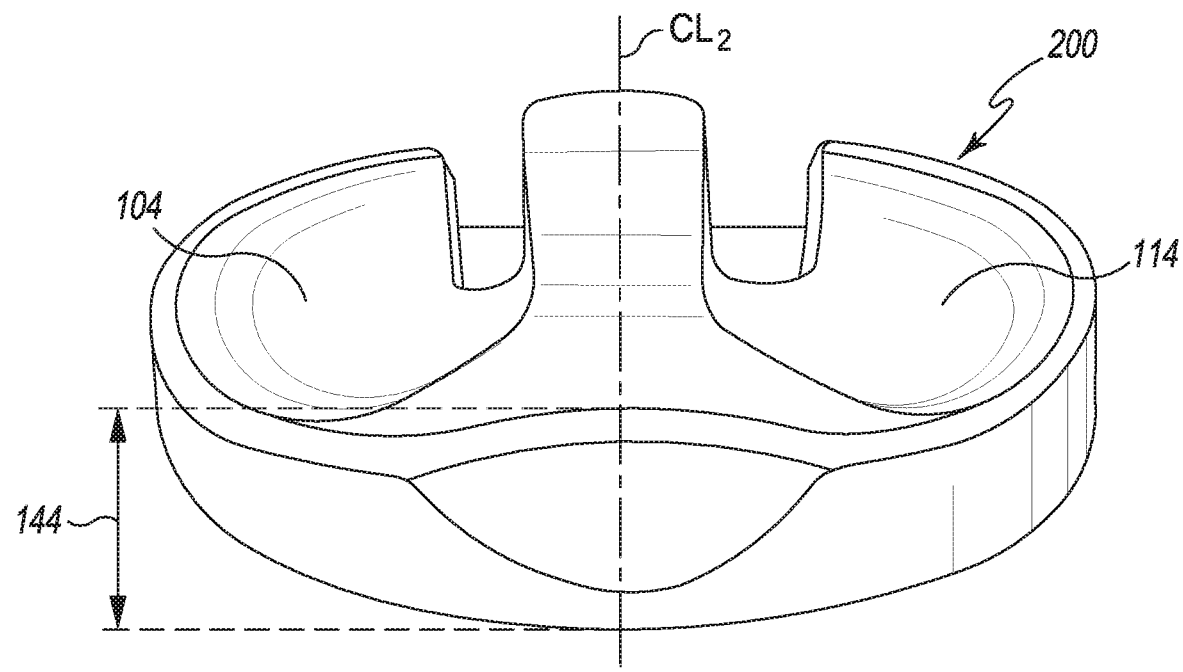
FIG. 2 is a front perspective view of a known tibial insert having a post located between symmetric articular surfaces.

Referring now to the drawings, and more particularly to FIG. 1, an illustrative embodiment of a tibial insert 100 provided in accordance with the present disclosure is illustrated. A known tibial insert 200 is illustrated in FIG. 2 for comparison. Each insert 100, 200 defines a respective anterior-posterior centerline CL1, CL2 and a medial articular surface 102, 104 on one half of the centerline CL1, CL2 and a lateral articular surface 112, 114 on the other half of the centerline CL1, CL2. Unlike the known tibial insert 200, the articular surfaces 102, 112 of the insert 100 are asymmetric to provide asymmetric pivoting of a femoral component bearing on the insert 100. The medial articular surface 102 of the insert 100 is more conforming to, for example, a condylar portion of a femoral component than the medial articular surface 104 of the insert 200. The insert 100 also has a relatively raised anterior surface (anterior medial lip 122) on a medial side of the insert 100, compared to the insert 200.

Figure 3A:
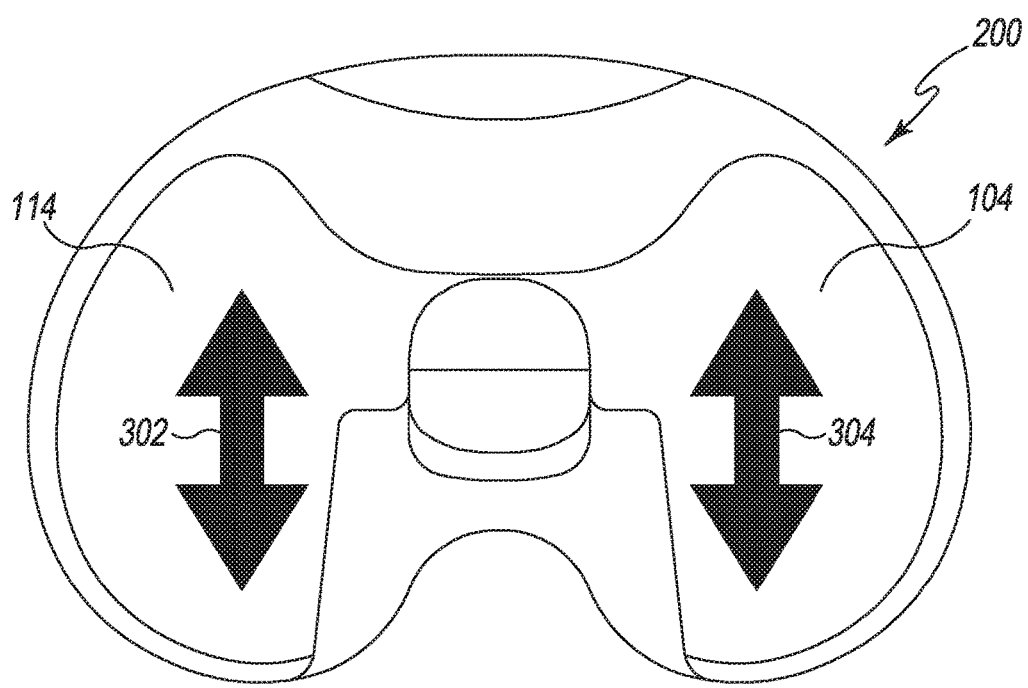
FIG. 3A is a superior plan view showing the known tibial insert of FIG. 2 in a transverse plane.
Figure 3B:
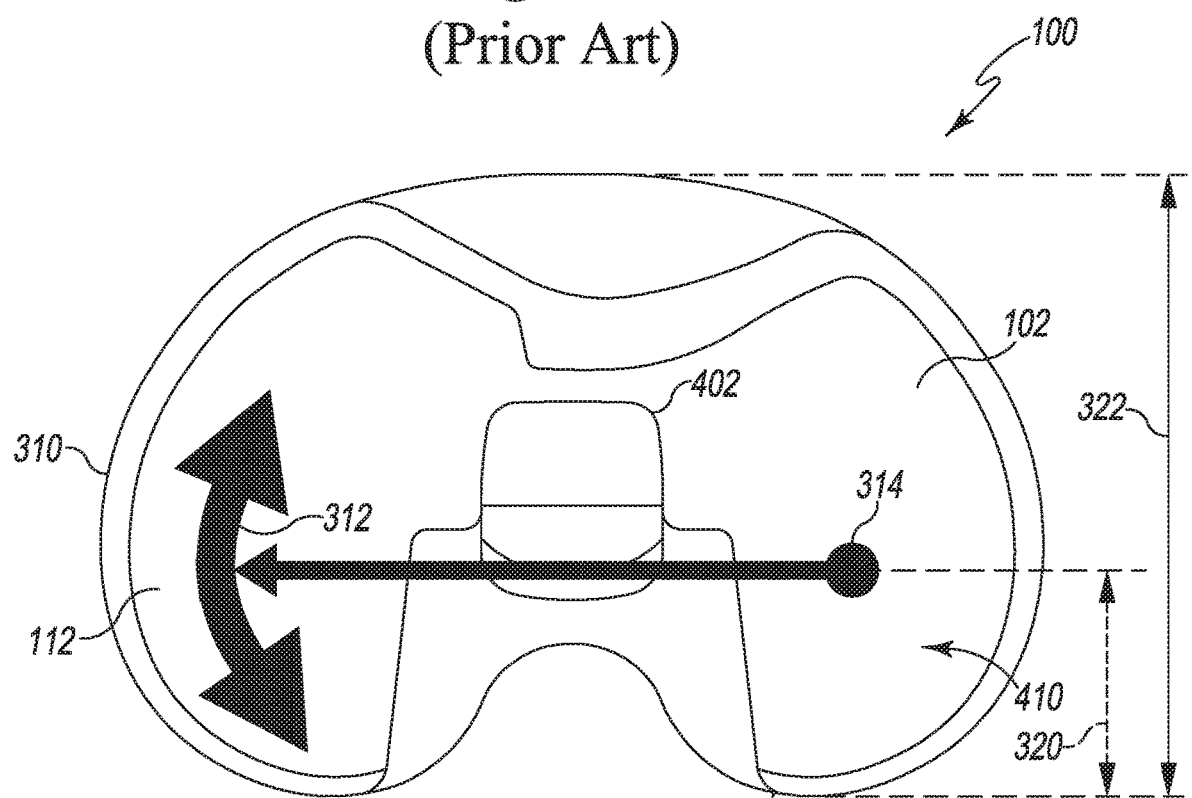
FIG. 3B is a superior plan view showing the tibial insert of FIG. 1 in a transverse plane.

With continued reference to FIGS. 1-2, and referring now to FIG. 3B as well, a lateral side 310 of the insert 100 provides an arcuate path 312, denoted by a curved arrow, for pivoting of the femoral component about a pivot point 314 extending through the medial articular surface 102. The arcuate path 312 may be laterally centered on the medial pivot point 314. This pivoting motion differs from the motion path 302, 304 of a femoral component bearing on the insert 200, which is symmetric as shown in FIG. 3A. Thus, the insert 100, unlike the insert 200, provides a medial pivot point for a femoral component bearing on the insert 100.

Figure 4:
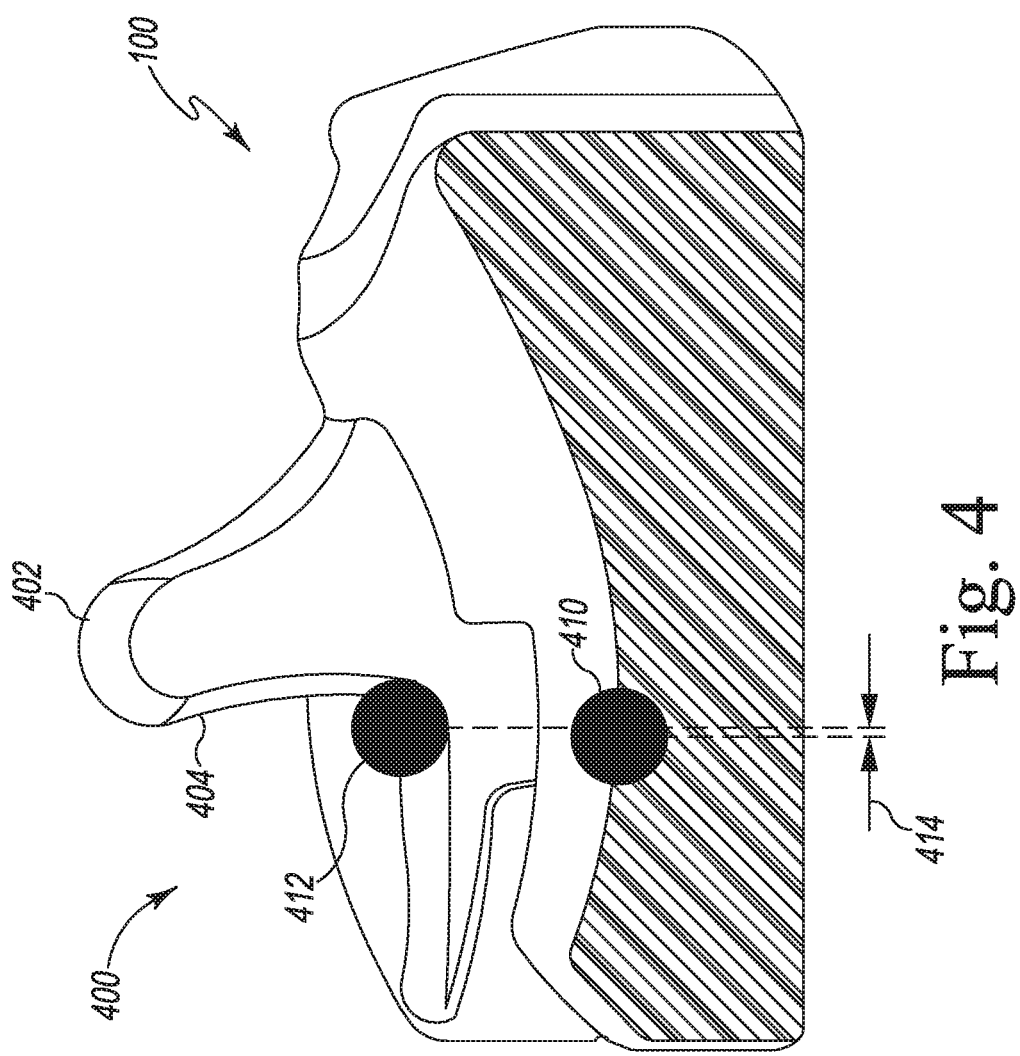
FIG. 4 is a side cross-sectional view showing the tibial insert of FIGS. 1 and 3B in a sagittal plane.
Figure 5:
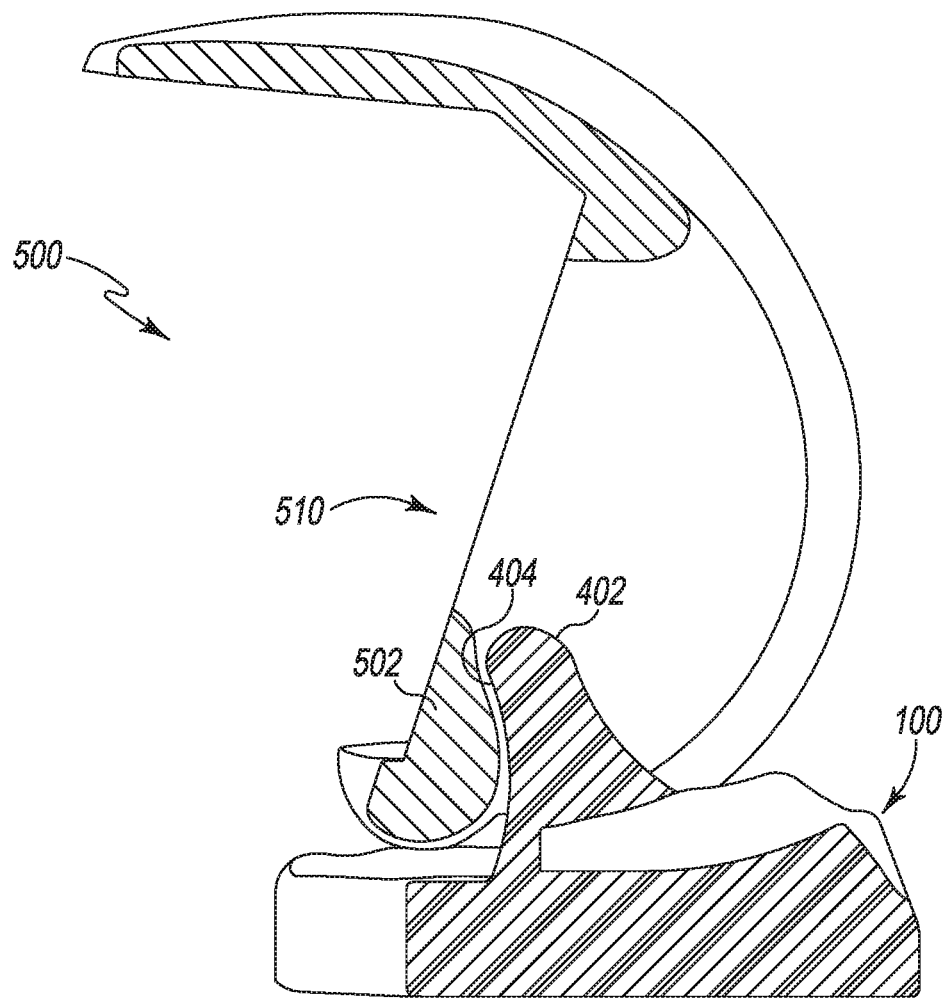
FIG. 5 is a partial cross-sectional view of an orthopaedic system, including a femoral component and the tibial insert of FIGS. 1 and 3B, having a first cross-section of the femoral component and a post of the tibial insert and a second cross-section of an articular surface of the tibial insert taken along different sagittal planes for clarity of the description.

Referring still to FIGS. 1 and 3, and referring now to FIGS. 4-5 as well, it can be seen that the insert 100 includes a post 402. An orthopaedic system 500 is illustrated in FIG. 5 that includes the insert 100 and a femoral component 510 bearing on the insert 100. The post 402 is shaped so that a cam 502 on the femoral component 510 engages the post 402 at a certain degree of flexion of the femoral component 510 following implantation.

Initially, anterior stability of the femoral component 510 is provided by the raised anterior surface of the tibial insert 100 (e.g., the anterior medial lip 122). As the femoral component 510 reaches greater degrees of flexion, the cam 502 of the femoral component 510 comes into contact with a cam engaging surface 404 of the post 402, which provides the anterior stability in deeper flexion. A dwell point 410 of the medial articular surface 102 of the insert 100 can be within a distance 414 of 5 millimeters (mm), anteriorly-posteriorly, of a point 412 on the post 402 at which the cam 502 first engages the post 402 to smoothly engage the post 402. The dwell point 410 may be located in a posterior region of the medial articular surface 102, with the posterior region having a length 320, extending from a posterior medial lip 330 of the medial articular surface 102, that is between 31% and 37% of the overall anterior-posterior length 322 of the tibial insert 100 (see FIG. 3B), or between 25% and 40% of the overall anterior-posterior length 322 in other embodiments. Deeper flexion of the femoral component 510, after the cam 502 engages the post 402, is supported by movement of the cam 502 along the cam engaging surface 404 of the post 402.

Figure 6A:
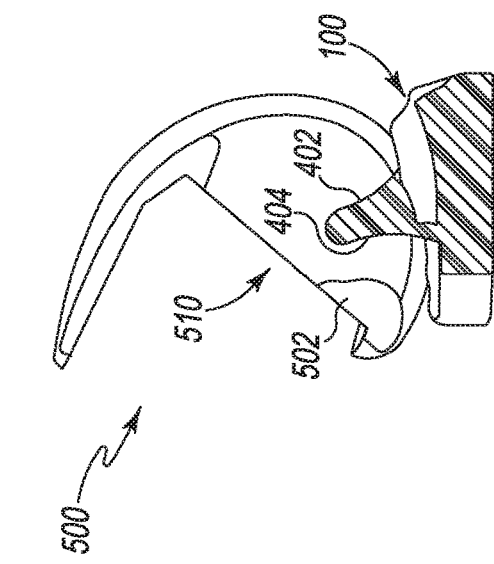
FIGS. 6A-6F are cross-sectional views of the orthopaedic system of FIG. 5 with the femoral component at differing degrees of flexion relative to the tibial insert, and having a first cross-section of the femoral component and a post of the tibial insert and a second cross-section of an articular surface of the tibial insert taken along different sagittal planes for clarity of the description.
Figure 6B:
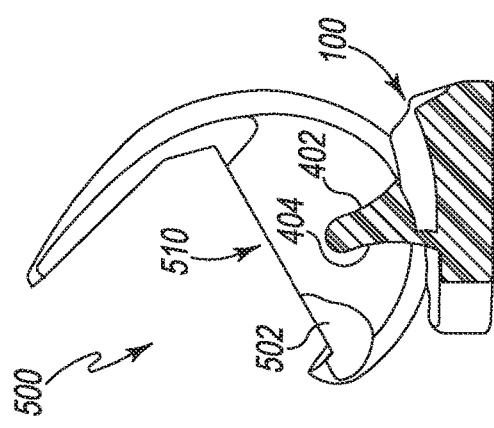
Figure 6C:
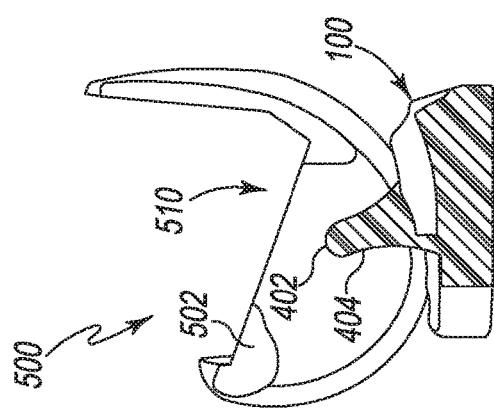
Figure 6D:
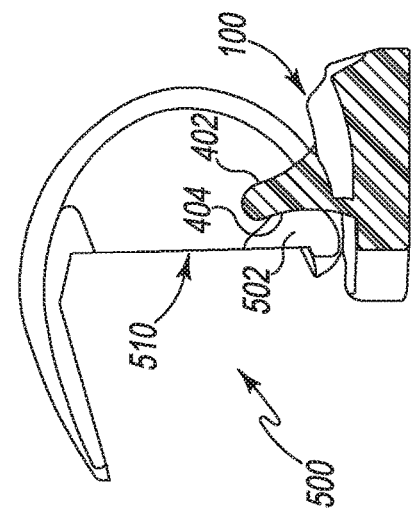
Figure 6E:
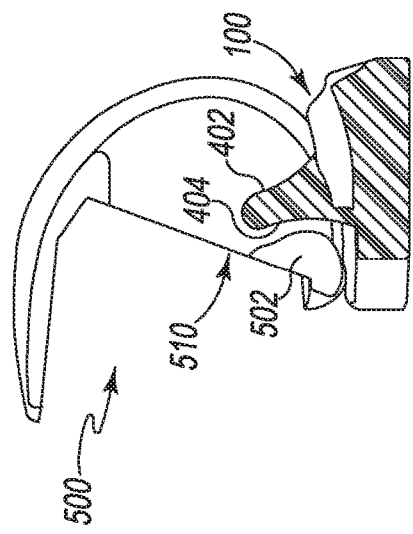
Figure 6F:
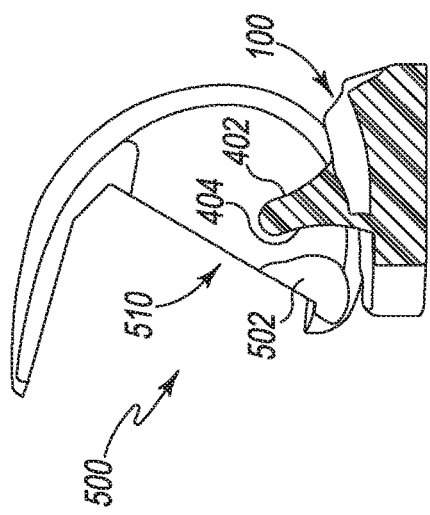

Referring now to FIGS. 6A-6F, the orthopaedic system 500 illustrated in FIG. 5 is illustrated with the femoral component 510 in various positions of flexion. Referring specifically to FIG. 6A, the system 500 is illustrated when the femoral component 510 is in a resting position with zero degrees of flexion. As can be appreciated, the cam 502 is spaced from the cam engaging surface 404 of the post 402 when the femoral component 510 is in the resting position. When the femoral component 510 has flexed 50 degrees, as illustrated in FIG. 6B, the cam 502 approaches the cam engaging surface 404 but has not yet come into engagement with the post 402. Similarly, the cam 502 may not engage the cam engaging surface 404 of the post 402 when the femoral component 510 has flexed 70 degrees, as illustrated in FIG. 6C. Thus, between 0 and 70 degrees of flexion, anterior stability of the femoral component 510 is provided by the raised anterior surface of the tibial insert 100. Upon the femoral component 510 reaching 80 degrees of flexion, as illustrated in FIG. 6D, the cam 502 of the femoral component 510 engages the cam engaging surface 404 of the post 402 of the insert 100. Of course, in other embodiments, the cam 502 may engage the cam engaging surface 404 at a degree of flexion in the range of 70 degrees to 90 degrees. In the illustratively embodiment, for further flexion past 80 degrees to, for example, 90 degrees (illustrated in FIG. 6E) or 110 degrees (illustrated in FIG. 6F), the post 402 provides anterior support for the femoral component 510 through engagement between the cam engaging surface 404 and the cam 502.

Figure 7B:
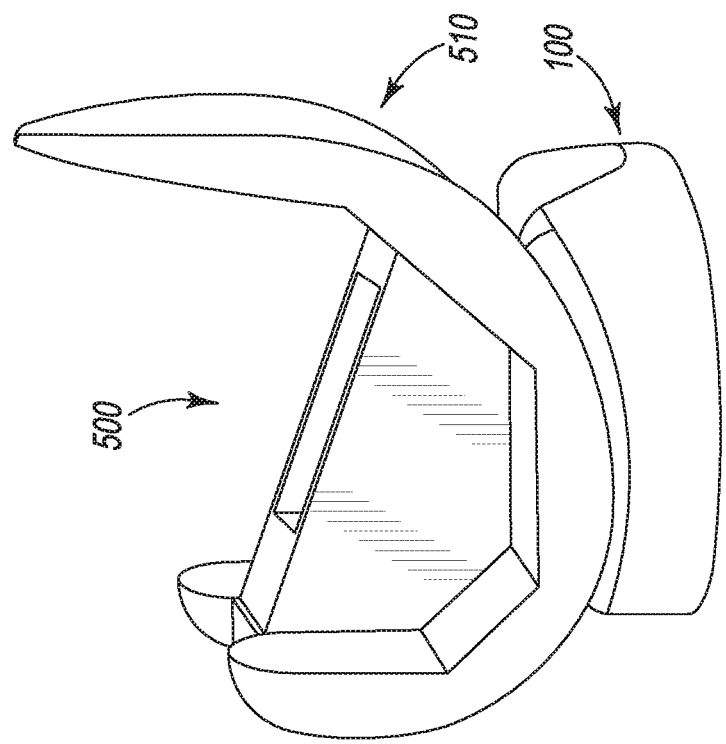
FIG. 7B is a side perspective view of the orthopaedic system of FIG. 5.
Figure 7A:
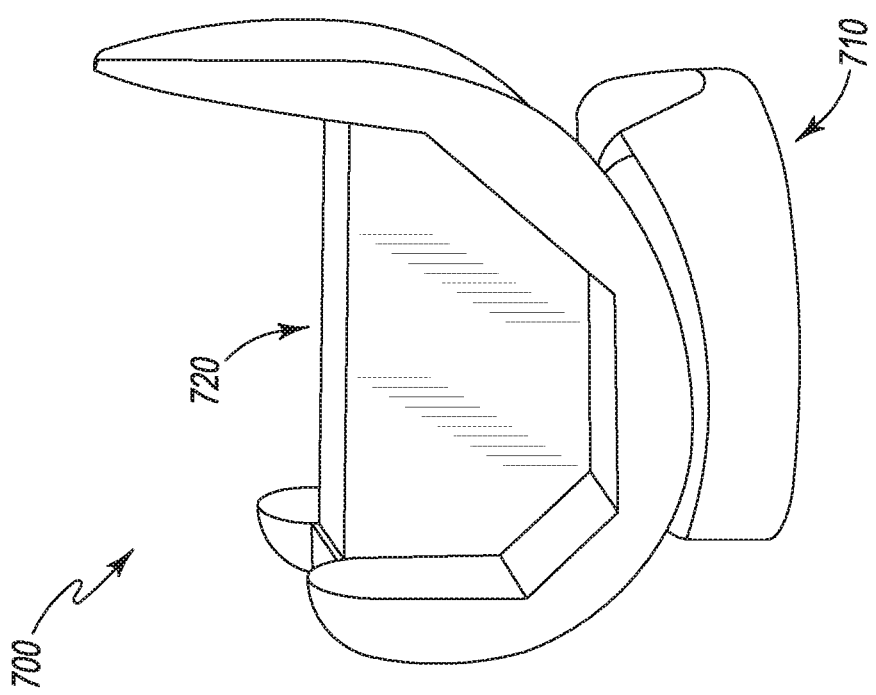
FIG. 7A is a side perspective view of another embodiment of an orthopaedic system.
Figure 8B:
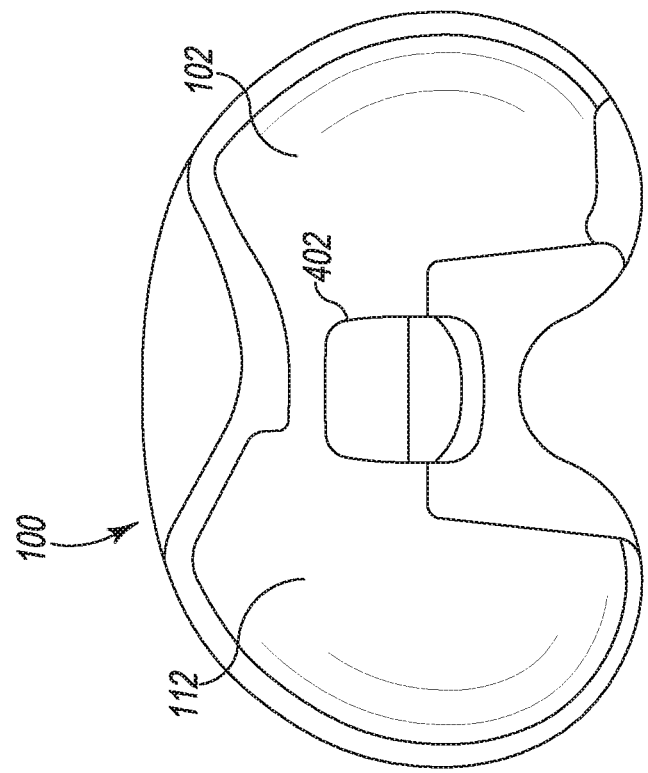
FIG. 8B is a superior plan view showing the tibial insert of FIGS. 1 and 3B in a transverse plane.
Figure 8A:
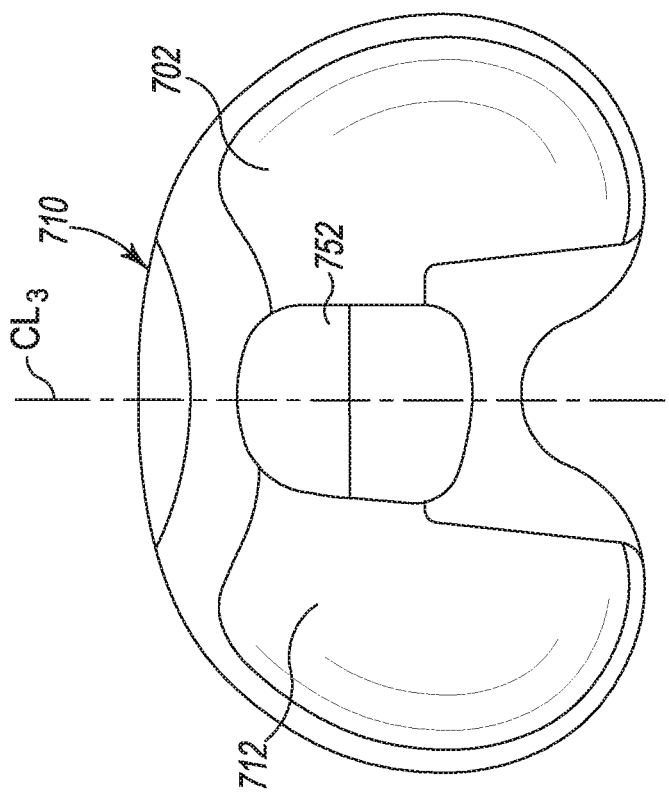
FIG. 8A is a superior plan view showing a tibial insert of the orthopaedic system of FIG. 7A in a transverse plane.
Figure 8D:
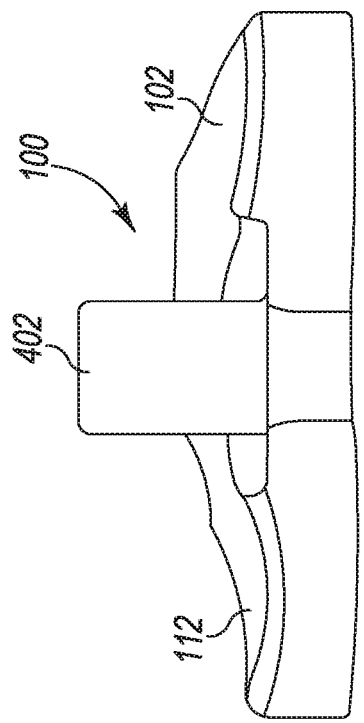
FIG. 8D is a rear elevation view of the tibial insert of FIGS. 1 and 3B.
Figure 8C:
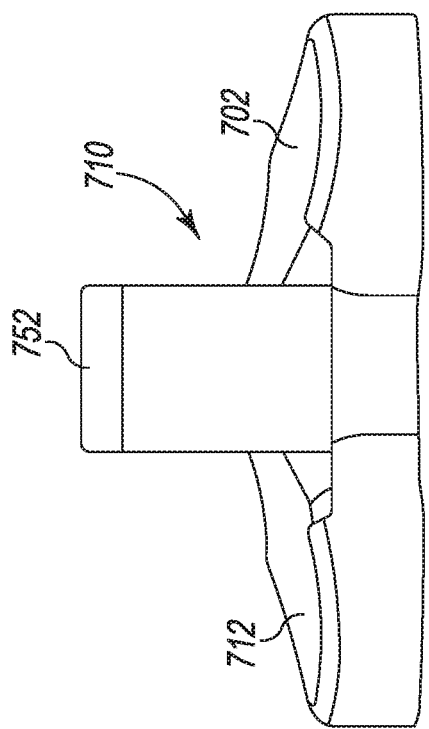
FIG. 8C is a rear elevation view of the tibial insert of the orthopaedic system of FIG. 7A.
Figure 8F:
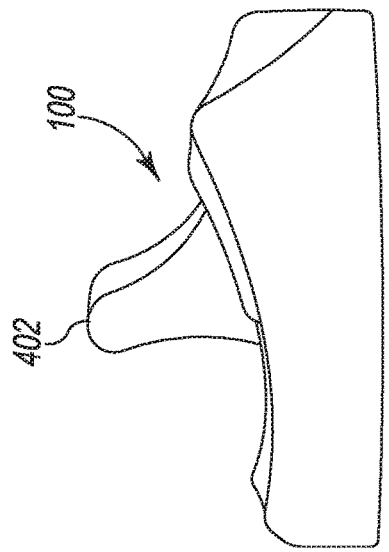
FIG. 8F is a side elevation view of the tibial insert of FIGS. 1 and 3B.
Figure 8H:
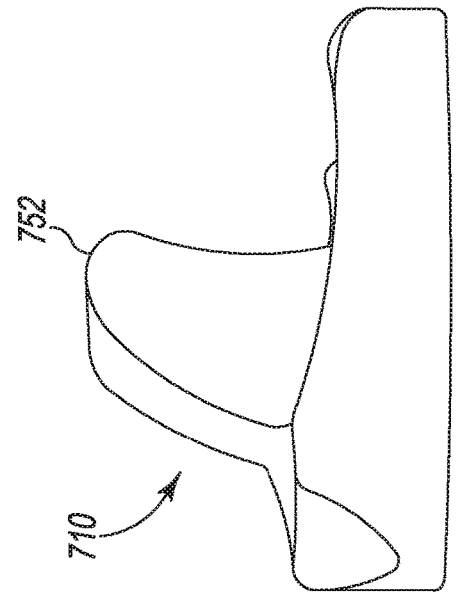
FIG. 8H is another side elevation view of the tibial insert of FIGS. 1 and 3B.
Figure 8E:
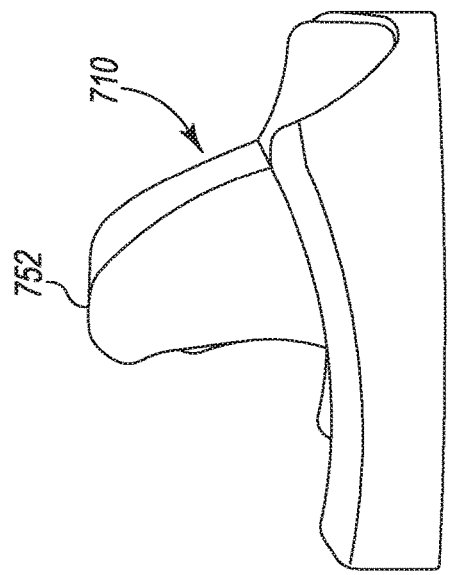
FIG. 8E is a side elevation view of the tibial insert of FIGS. 1 and 3B.
Figure 8G:
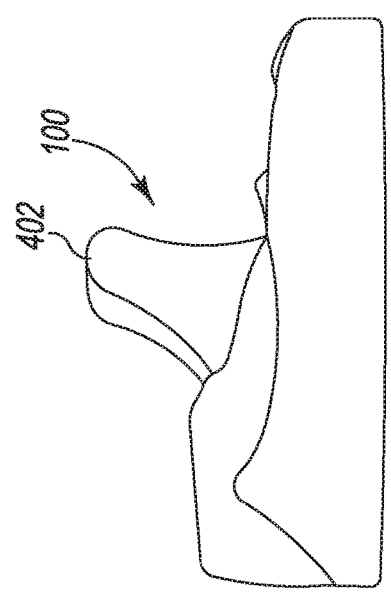
FIG. 8G is another side elevation view of the tibial insert of FIGS. 1 and 3B.

Referring now to FIGS. 7A and 7B, the orthopaedic system 500 of FIG. 5 is illustrated in FIG. 7B along with an orthopaedic system 700 including a tibial insert 710 and a femoral component 720 bearing on the tibial insert 710 illustrated in FIG. 7A. Referring also to FIGS. 8A-8I, the tibial inserts 100, 710 are illustrated side-by-side for comparison. The insert 100 may be referred to as a "posterior-stabilized" (PS) insert. The tibial insert 710, which may be referred to as a "revision constrained condylar" (CCK) insert, defines an anterior-posterior centerline CL3 with a medial articular surface 702 on one side and a lateral articular surface 712 on the other side of the centerline CL3. Similarly to the insert 100, the tibial insert 710 also has asymmetric articular surfaces, a more conforming medial articular surface 702, and a relatively raised anterior surface (anterior medial lip height 822 as shown in FIG. 8J) on a medial side of the tibial insert 710, compared to the insert 200 (anterior medial lip height 144 as shown in FIG. 2). The tibial insert 710 also includes a post 752, similar to the insert 100, with the post 752 of the tibial insert 710 being significantly larger than the post 402 of the insert 100, and the area of the tibial insert 710 being shaped differently to accommodate the larger post 752 and allow medial pivoting of the femoral component 720.

Figure 9A:
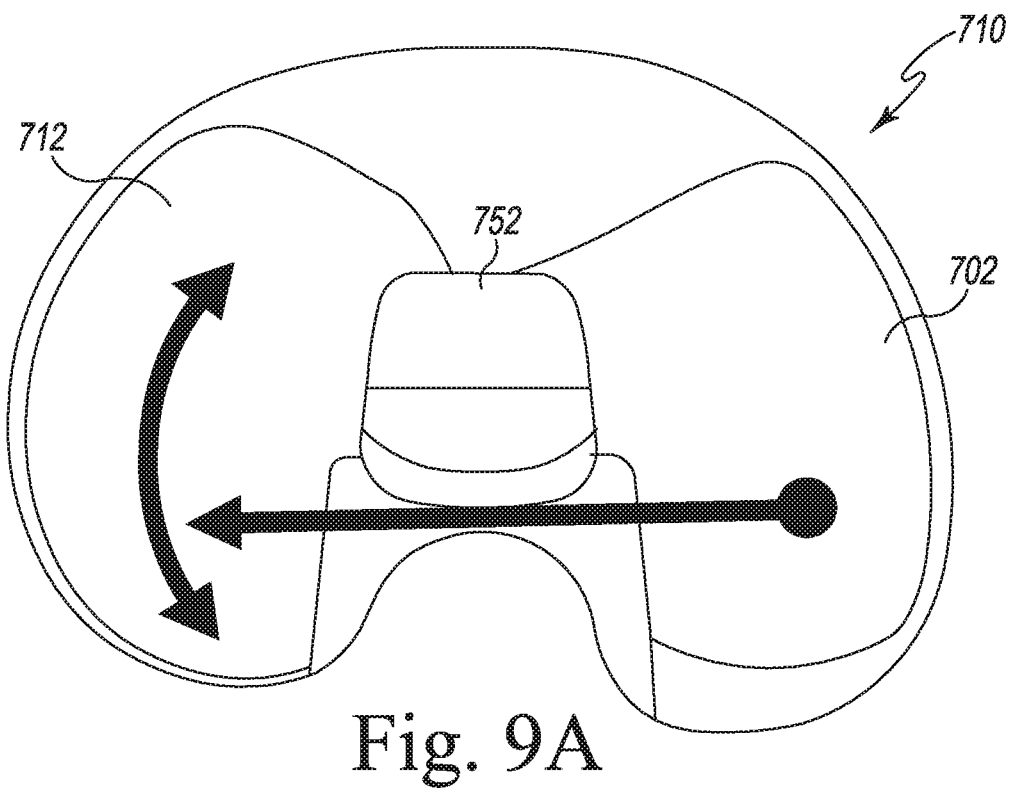
FIGS. 9A and 9B are superior plan views of the tibial insert of the orthopaedic system of FIG. 7A illustrating the medial pivot motion of the orthopaedic system during flexion.
Figure 9B:
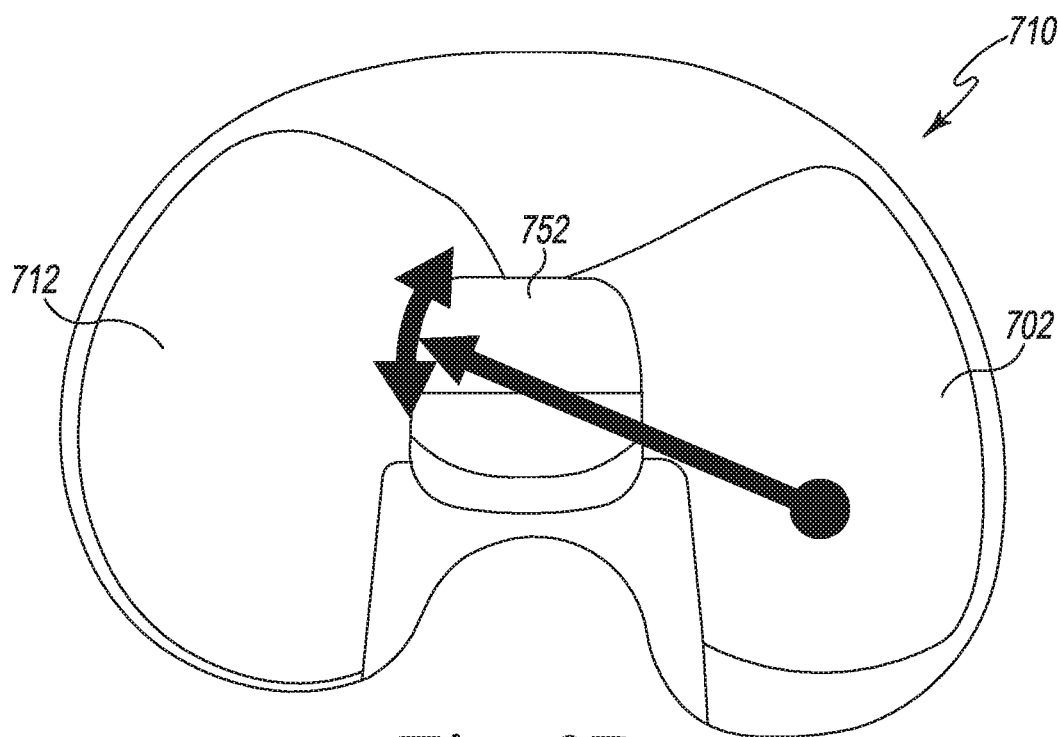

Referring now to FIGS. 9A and 9B, the medial pivoting action of the femoral component 720 is illustrated. As illustrated by the arrows, the femoral component 720 pivots by the post 752 of the tibial insert 710, which is shaped to provide clearance and avoid impingement of the femoral component 720. The shape of the post can be altered, as needed, to accommodate differently sized and shaped femoral components.

Figure 10A:
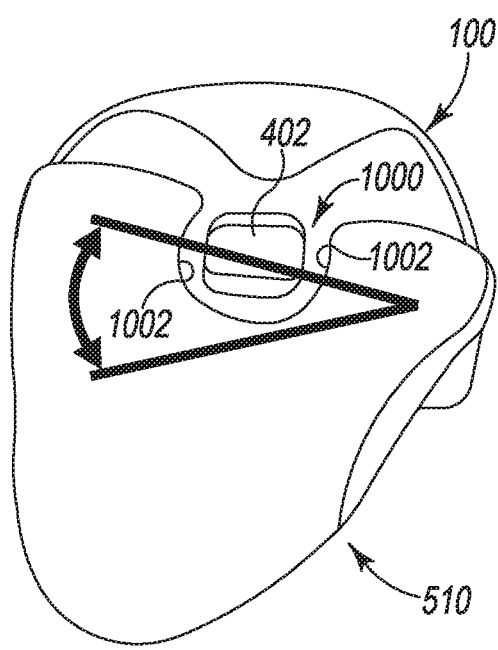
FIG. 10A is a superior plan view of the orthopaedic system of FIG. 7A shown in a degree of flexion.
Figure 10B:
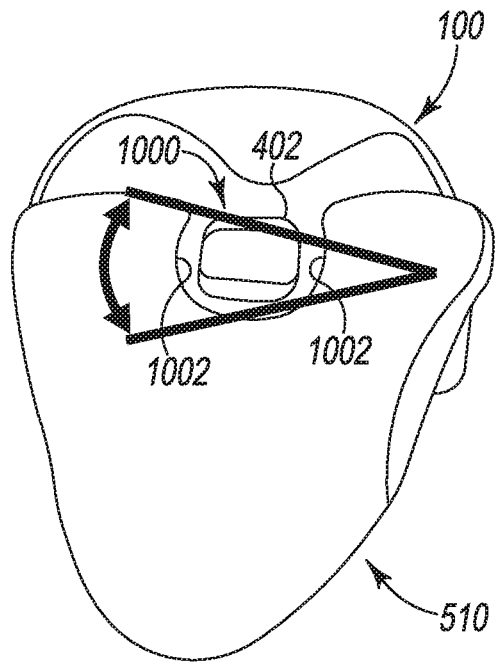
FIG. 10B is a superior plan view of the orthopaedic system of FIG. 7A shown in a different degree of flexion.
Figure 10C:
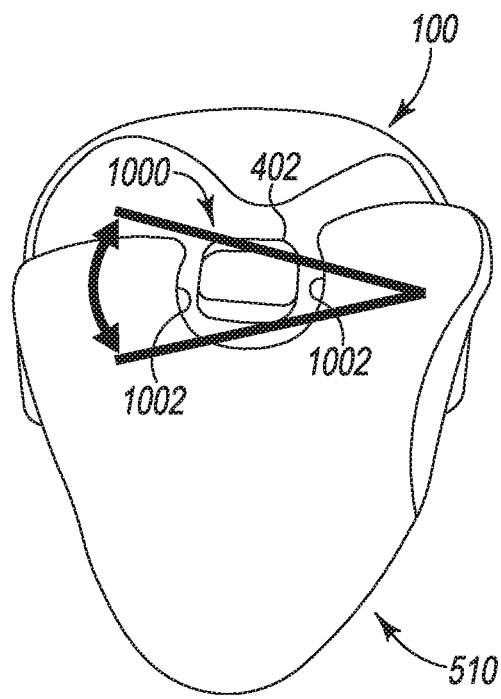
FIG. 10C is a superior plan views of the orthopaedic system of FIG. 7A shown in yet a different degree of flexion.
Figure 10D:
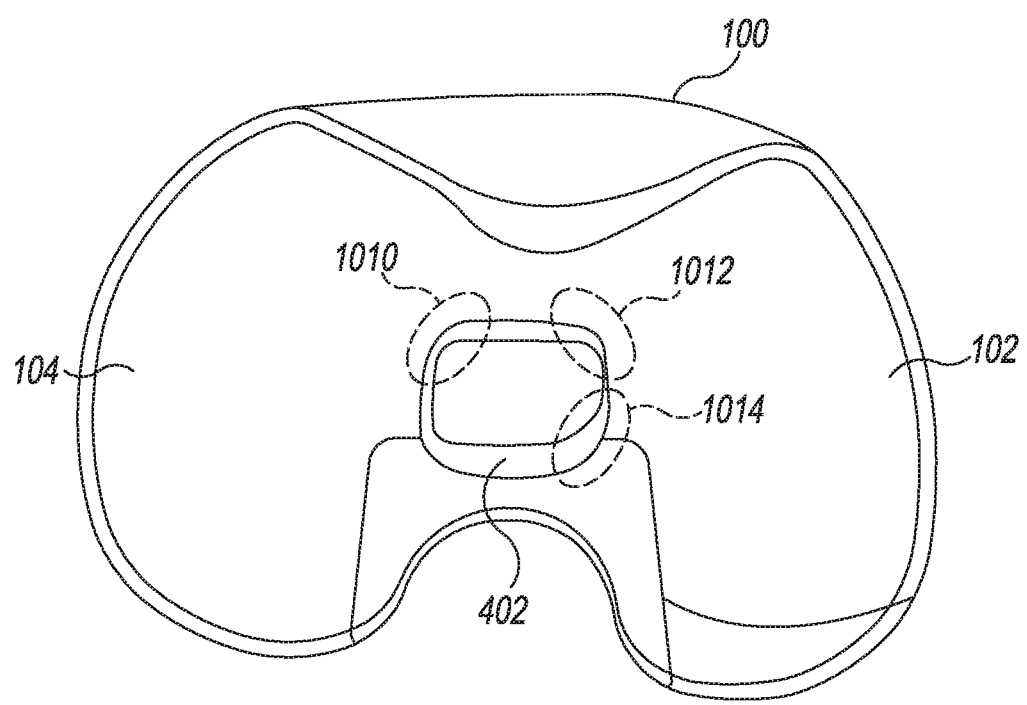
FIG. 10D is a superior plan view of a tibial tray of the orthopaedic system of FIG. 7A.

Referring now to FIGS. 10A-10D, pivotal motion of the femoral component 510 on the insert 100 is illustrated. As can be seen, the femoral component 510 may pivot medially across a range of angles because the post 402 does not impinge the femoral component 510. The femoral component 510 may have, for example, a post recess 1000 formed by curved inner walls 1002 of the femoral condyles of the femoral component that has a curved shape (e.g., curved inner walls) and an articulating surface of the cam 502 that stays in contact with the post 402 during deep flexion to help control pivoting. In order to allow pivoting, the post 402 of the insert 100 can have rounded corners that do not act as stops for the recess. Such a configuration allows controlled medial pivoting of the femoral component 510 against the insert 100. For example, as best shown in FIG. 10D, the post 402 may have an asymmetric shaped top profile (e.g., a medial side of the post 402 may be asymmetric relative to a lateral side). In the illustrative embodiment of FIG. 10D, the post 402 includes a curved medial-anterior surface 1010, a curved lateral-anterior surface 1012, and a curved lateral-posterior surface 1014, each of which is curved to facilitate the medial pivoting motion of the femoral component 510 during flexion. For example, the curved medial-anterior surface 1010 and the curved lateral-posterior surface 1014 may be configured to facilitate the medial pivoting of the femoral component 510 during deep flexion.

Figure 11A:
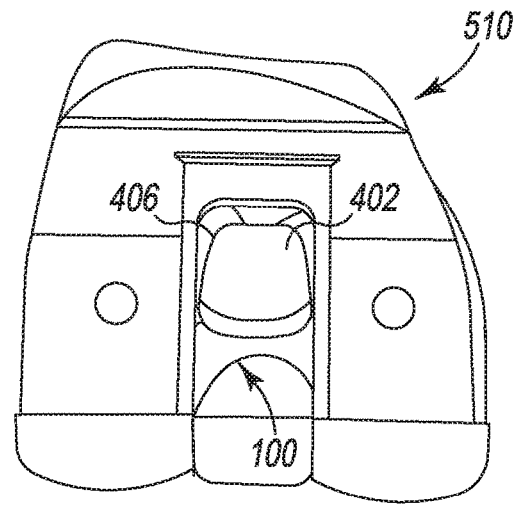
FIG. 11A is a plan view of the orthopaedic system of FIG. 5 at an initial degree of flexion.
Figure 11B:
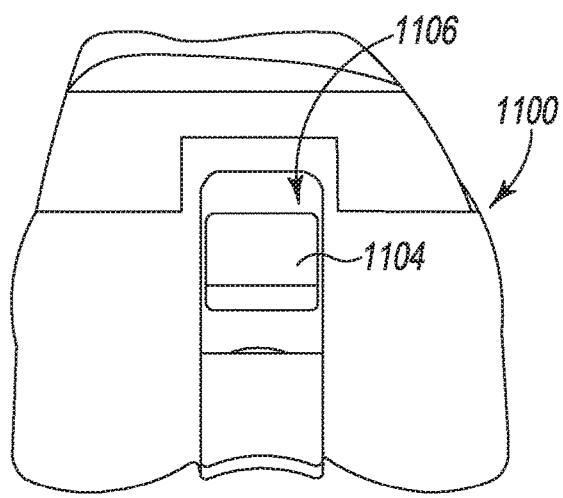
FIG. 11B is a plan view of a known orthopaedic system at an initial degree of flexion.
Figure 11C:
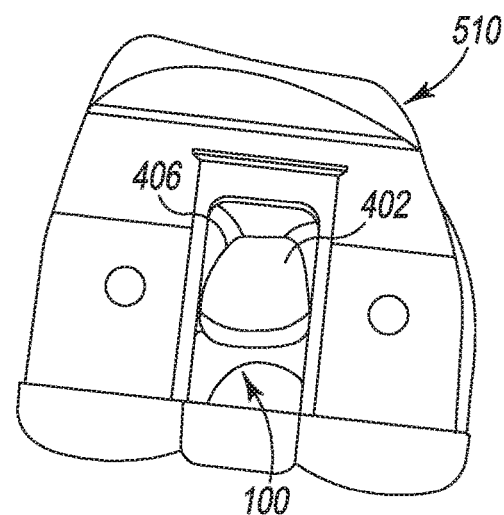
FIG. 11C is a plan view of the orthopaedic system of FIG. 5 shown at a degree of flexion different from the initial degree of flexion of FIG. 11A.
Figure 11D:
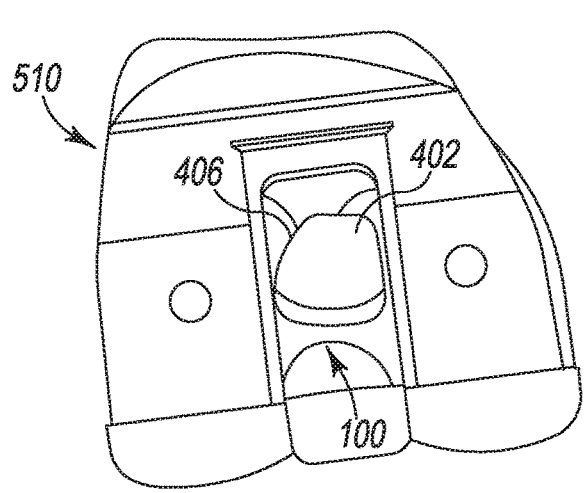
FIG. 11D is a plan view of the orthopaedic system of FIG. 5 shown at another different degree of flexion different from the initial degree of flexion of FIG. 11A.

Referring now to FIGS. 11A-11D, pivotal motion of the femoral component 510 on the insert 100 is illustrated. For comparison, a known orthopaedic system 1100 is illustrated in FIG. 11B. As can be seen in FIG. 11B, the known orthopaedic system 1100 includes an insert having a post 1104 with rectangular corners 1106 that abut against a recess in the corresponding femoral component. This abutment acts as a stop so pivoting of the femoral component of the known orthopaedic system 1100, medial or otherwise, is mostly limited by the post 1104. The post 1104 of the insert 100, on the other hand, has rounded corners 406 that allow medial pivoting of the femoral component 510.

Figure 12:
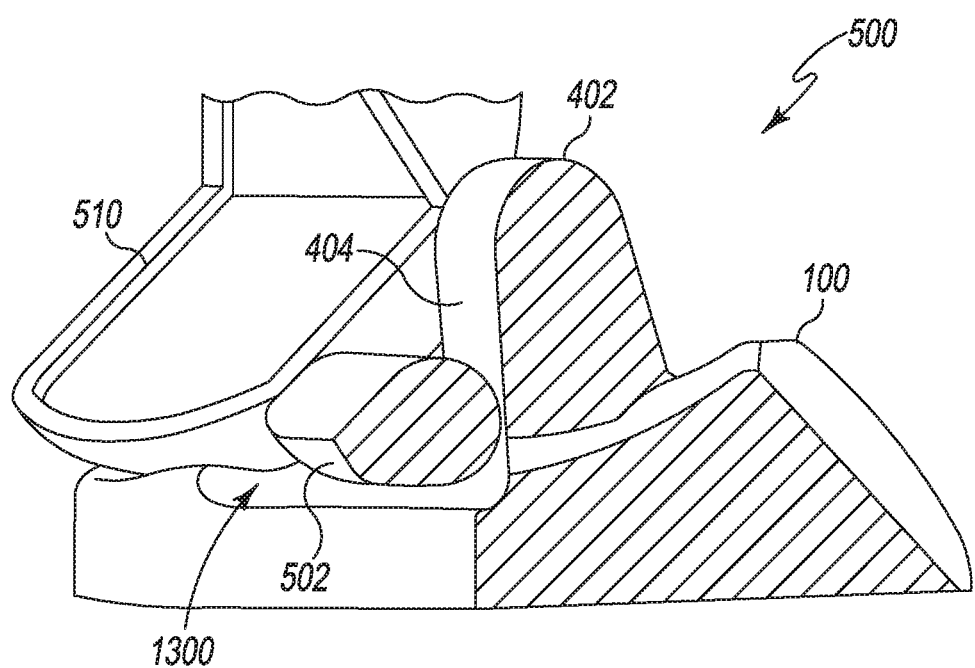
FIG. 12 is a perspective, cross-sectional view of the orthopaedic system of FIG. 5 in deep flexion, illustrating the contact between a cam of the femoral component and a post of the tibial insert, and having a first cross-section of the femoral component and the post of the tibial insert and a second cross-section of an articular surface of the tibial insert taken along different sagittal planes for clarity of the description.
Figure 13:
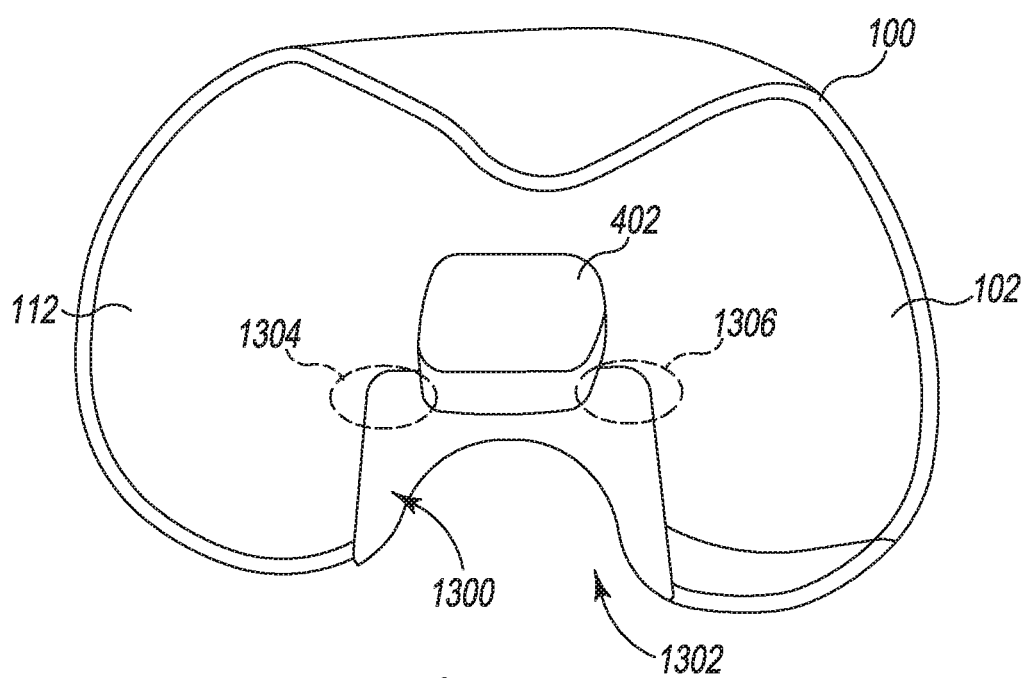
FIG. 13 is a superior plan view showing a tibial insert similar to the tibial insert of FIG. 1 in a transverse plane.

Referring now to FIGS. 12-13, the femoral component 510 and the insert 100 are illustrated to show a recess 1300 that is formed in a posterior surface 1302 of the insert 100. The recess 1300 may be formed adjacent to posterior corners 1304, 1306 of the post 402 and adjacent to the cam 502 of the femoral component 510 so the cam 502 can pivot around the post 402 without contacting the articular surfaces 102, 112 of the insert 100.

Referring now to FIGS. 14A-14B and 15A-15C, another illustrative embodiment of an orthopaedic system 1400 is illustrated that includes a tibial insert 1410 and a femoral component 1420 that articulates on the tibial insert 1410. As shown best in FIG. 15B, the tibial insert 1410 has asymmetric medial and lateral articular surfaces 1402, 1412, a more conforming medial articular surface 1402, and a relatively raised anterior surface on a medial side of the tibial insert 1410, similar to insert 100, compared to the known tibial insert 200.

Figure 14A:
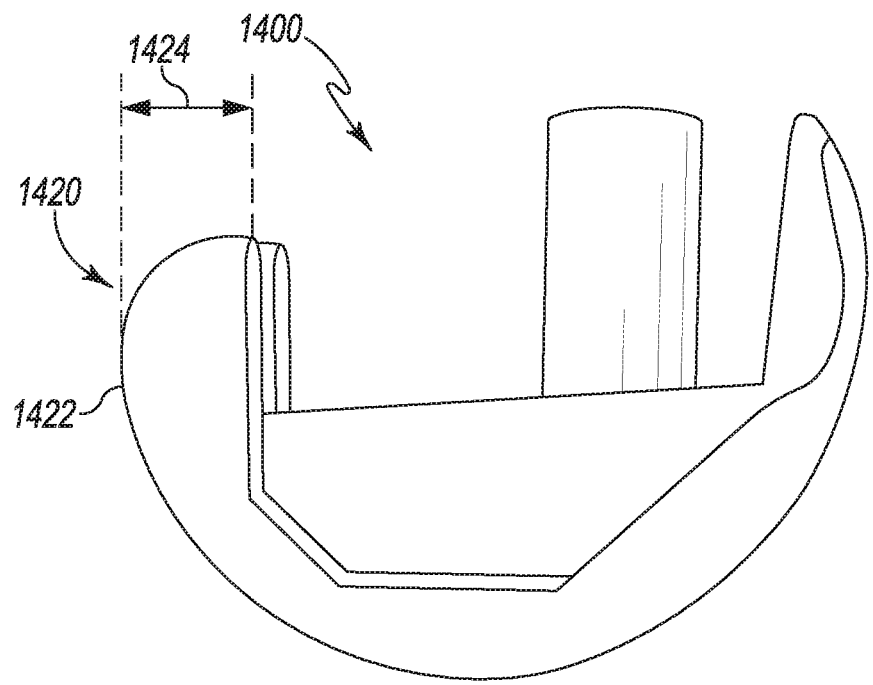
FIG. 14A is a side perspective view of a plus-size femoral component.
Figure 14B:
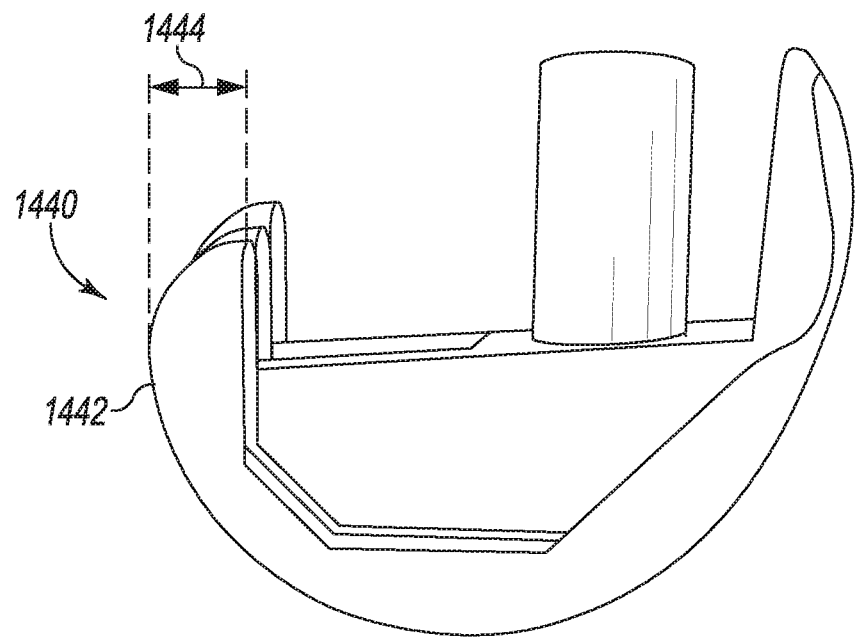
FIG. 14B is a side perspective view of a non-plus-size femoral component.
Figure 15B:
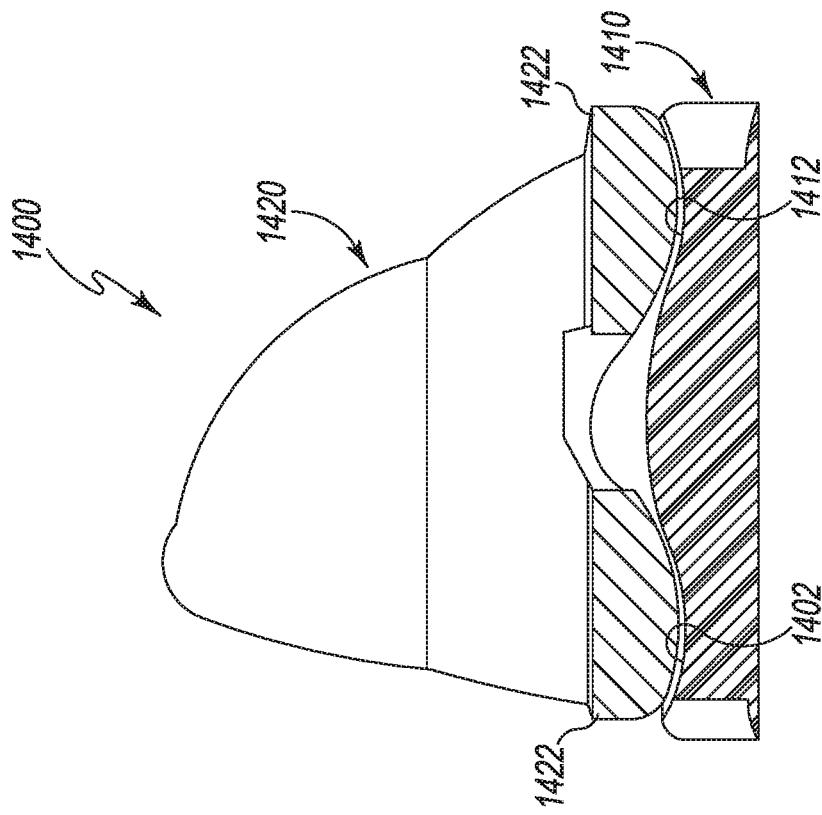
FIG. 15B is a rear cross-sectional view of the orthopaedic system of FIG. 15A taken generally along a coronal plane.
Figure 15A:
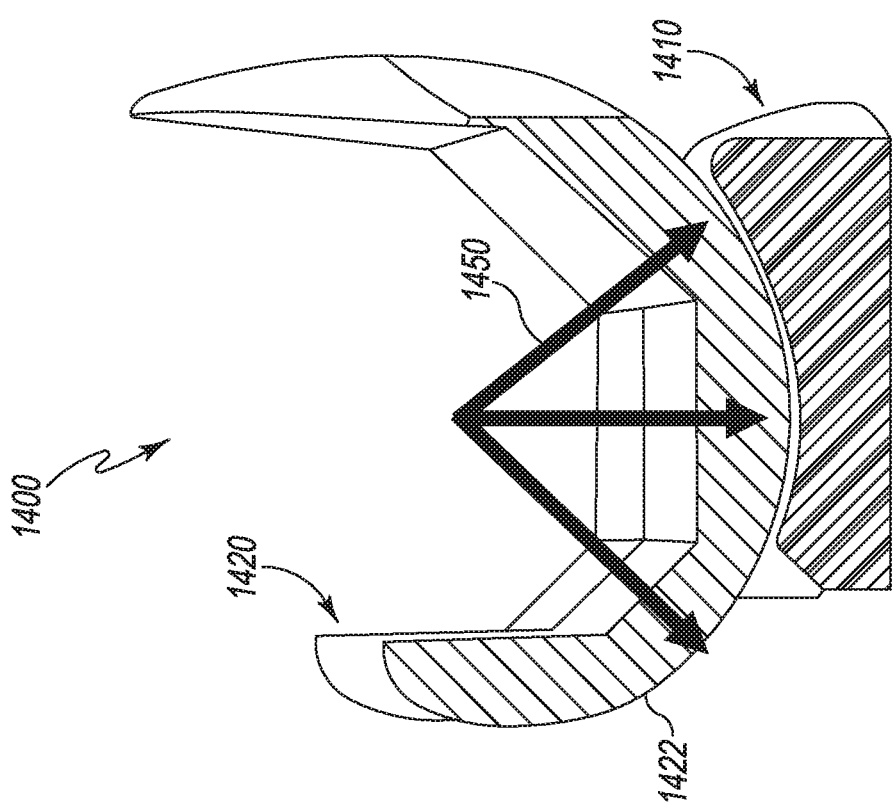
FIG. 15A is a side cross-sectional, perspective view of an orthopaedic system, including the femoral component of FIG. 14A, taken generally along a sagittal plane.
Figure 15C:
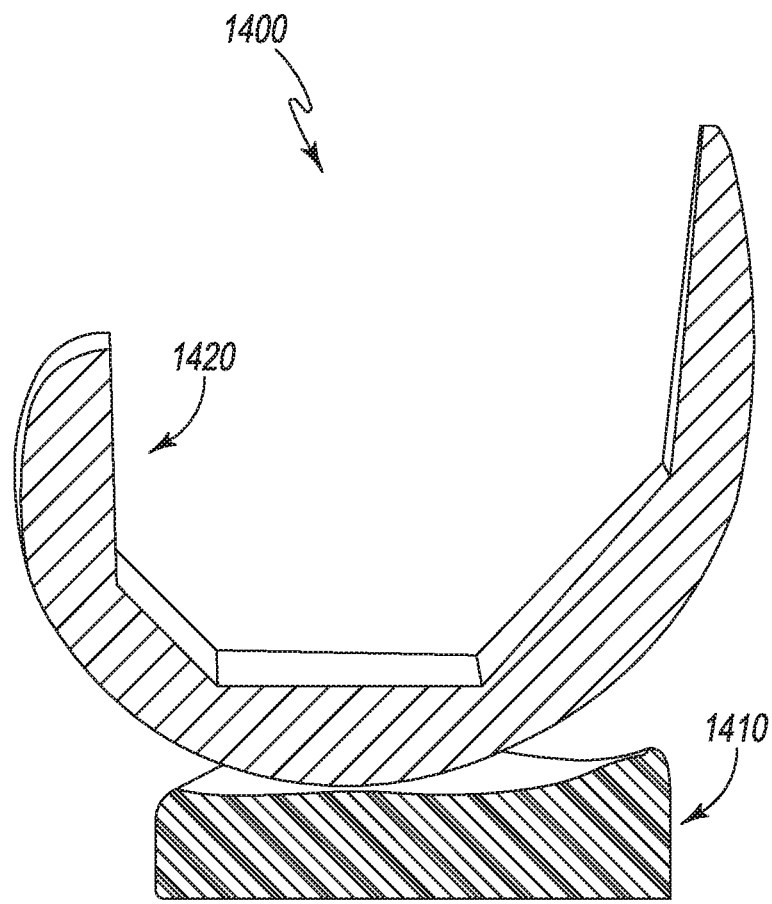
FIG. 15C is another side cross-sectional view of the orthopaedic system of FIG. 15A taken generally along a sagittal plane.

The orthopaedic system 1400 is a revision system for use in a revision surgery. In revision surgeries, there is often a loose flexion gap. The knee in extension is well balanced but there can be 3-4 mm of looseness when the knee is flexed to 90 degrees. This looseness is especially pronounced when using "plus-size" revision systems, which are designed for implantation in patients that are larger than average. To reduce the amount of looseness and tighten up the conformity, the femoral component 1420 has relatively thick condyles 1422 compared to condyles 1442 of a standard, i.e., non-plus-size, femoral component 1440, which is illustrated in FIG. 14B. For example, the condyles 1422 of the femoral component 1420 may have a thickness 1424 (e.g., a sagittal width) that is 3-4 millimeters greater than a thickness 1444 (e.g., a sagittal width) of the condyles 1442 of the standard femoral component 1440 to account for the looseness. Both of the femoral components illustrated in FIG. 14A and FIG. 14B can have a constant radius into deep flexion, but the femoral component 1420 has a larger radius past deep flexion due to the thicker condyles 1422.

To accommodate the larger radius of the condyles 1422, the tibial insert 1410 can have a conforming surface to the femoral component 1420. For example, the tibial insert 1410 can have a posterior dwell point on the conforming medial articular surface 1402 that is located between 31% to 37% of the overall anterior-posterior length of the tibial insert 1410 relative to a posterior medial lip of the medial articular surface 1402 similar to the dwell point 410 discussed above in regard to FIG. 3B. The femoral component 1420 may include a constant radius of curvature 1450 between 10° and 30° anterior and between 30° and 90° posterior. A conformity between the condyles 1422 of the femoral component 1420 and at least one of the medial articular surface 1402 and/or the lateral articular surface 1412 may be at least, or greater than, 96%. Further, a medial-lateral conformity between the radius of curvature 1450 of the femoral component 1420 and the medial-lateral curvature of the medial articular surface 1402 and/or the lateral articular surface 1412 of the tibial insert 1410 may be 93% or greater. Additionally, the tibial insert 1410 may have a slope of the tibial insert 1410 between 0° and 10°. It should be appreciated that the tibial insert 1410 is illustrated with the plus-size femoral component 1420 bearing on the tibial insert 1410, but a standard size femoral component can also be used with the tibial insert 1410.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A posterior-stabilized orthopaedic system comprising:
a femoral component having a medial condyle, a lateral condyle spaced apart from the medial condyle by a notch, and cam located in the notch between the medial and lateral condyles; and
a tibial insert having a medial articular surface, a lateral articular surface, and a post located between the medial and lateral articular surfaces, wherein the medial and lateral articular surfaces are asymmetrically-shaped relative to each other,
wherein the medial condyle of the femoral component is configured to articulate on the medial articular surface of the tibial insert and the lateral condyle of the femoral component is configured to articulate on the lateral articular surface of the tibial insert during flexion and wherein the cam of the femoral component initially contacts a posterior surface of the post of the tibial insert at a contact location on the post during flexion,
wherein, when the tibial insert is viewed in a sagittal plane, the medial articular surface of the tibial insert includes a dwell point that is spaced by a distance in an anterior-posterior direction from the contact location of the post, the distance being less than or equal to 5 millimeters
wherein the lateral articular surface includes an arcuate path along which the lateral condyle of the femoral component moves when the femoral component articulates on the tibial insert such that the lateral condyle pivots about a pivot point located on the medial articular surface, the arcuate path being defined by a radius having an origin located at the pivot point of the medial articular surface,
wherein the post of the tibial insert, when viewed in a transverse plane, includes a curved lateral-anterior surface located between a lateral surface and an anterior surface of the post, a curved medial-anterior surface located between a medial surface and the anterior surface of the post, a curved lateral-posterior surface located between the lateral surface and a posterior surface of the post, and a curved medial-posterior surface located between the medial surface and the lateral surface of the post,
wherein a radius of curvature of each of the curved lateral-anterior surface and the curved medial-posterior surfaces is greater than a radius of curvature of the curved lateral-posterior surface of the post.

2. The posterior-stabilized orthopaedic system of claim 1, wherein the dwell point is located on the medial articular surface of the tibial insert a distance from a posterior medial lip of the medial articular surface that is no more than 37% the overall anterior-posterior length of the medial articular surface.

3. The posterior-stabilized orthopaedic system of claim 1, wherein the tibial insert includes an anterior medial lip having a first height and an anterior lateral lip having a second height, and wherein the first height of the anterior medial lip is greater than the second height of the anterior lateral lip.

4. The posterior-stabilized orthopaedic system of claim 1, wherein the post has a medial side and a lateral side that is asymmetric with the medial side when viewed in a transverse plane.

5. The posterior-stabilized orthopaedic system of claim 1, wherein the post has an asymmetric profile when viewed in a transverse plane.

6. The posterior-stabilized orthopaedic system of claim 1, wherein the medial articular surface of the tibial insert and a femoral articular surface of the medial condyle of the femoral component are more conforming than the lateral articular surface of the tibial insert and a femoral articular surface of the lateral condyle of the femoral component.

7. The posterior-stabilized orthopaedic system of claim 6, wherein the medial articular surface of the tibial insert and the femoral articular surface of the medial condyle have a medial-lateral conformity of at least 93%, and wherein the lateral articular surface of the tibial insert and the femoral articular surface of the lateral condyle have a medial-lateral conformity of at least 93%.

* * * * *